(12) United States Patent
Chen

(10) Patent No.: US 12,319,504 B2
(45) Date of Patent: Jun. 3, 2025

(54) INTELLIGENT WAREHOUSING SYSTEM, PROCESSING TERMINAL, WAREHOUSE ROBOT AND INTELLIGENT WAREHOUSING METHOD

(71) Applicant: HAI ROBOTICS CO., LTD., Guangdong (CN)

(72) Inventor: Yuqi Chen, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 877 days.

(21) Appl. No.: 17/451,990

(22) Filed: Oct. 22, 2021

(65) Prior Publication Data

US 2022/0041376 A1 Feb. 10, 2022

Related U.S. Application Data

(63) Continuation of application No. PCT/CN2020/086531, filed on Apr. 24, 2020.

(30) Foreign Application Priority Data

Apr. 24, 2019 (CN) .......................... 201910332830.7

(51) Int. Cl.
*B65G 1/137* (2006.01)
*B25J 9/16* (2006.01)
*G05D 1/00* (2024.01)

(52) U.S. Cl.
CPC .......... *B65G 1/1373* (2013.01); *B25J 9/1682* (2013.01); *B25J 9/1687* (2013.01); *G05D 1/0287* (2013.01)

(58) Field of Classification Search
CPC ...... B65G 1/1373; B65G 1/10; B65G 1/1375; B65G 1/1378; B65G 1/04; B65G 47/902;
(Continued)

(56) References Cited

U.S. PATENT DOCUMENTS 9,988,216 B1 6/2018 McCalib, Jr. et al.
10,962,963 B2 * 3/2021 Zanger ............. G05B 19/41865
(Continued)

FOREIGN PATENT DOCUMENTS

CN 203287938 U 11/2013
CN 107032031 A 8/2017
(Continued)

OTHER PUBLICATIONS

The First Chinese Office Action dated Nov. 1, 2023; Appln. No. 201910332830.7 English Translation of Concise Explanation of Relevance for CNOA1.
(Continued)

*Primary Examiner* — Michael Collins
(74) *Attorney, Agent, or Firm* — Frank Gao, Esq.

(57) ABSTRACT

The technical field of intelligent warehousing is related, and an intelligent warehousing system, a processing terminal, a warehouse robot, and an intelligent warehousing method are disclosed. Where the intelligent warehousing system (100) includes: a warehouse robot (10) and a material fetching device (20); the warehouse robot includes a first warehouse robot (11) and/or a second warehouse robot (12); the first warehouse robot is configured to receive a first scheduling instruction, and handle a material box to a first target position according to the first scheduling instruction; the second warehouse robot is configured to receive a second scheduling instruction, and handle a portable shelf to a second target position according to the second scheduling instruction; and the material fetching device is configured to receive a material fetching instruction, and fetch a material from the material box and/or the portable shelf according to the material fetching instruction.

15 Claims, 14 Drawing Sheets

(58) Field of Classification Search
CPC ...... B65G 47/914; B65G 1/0492; B65G 1/06; B65G 47/904; B65G 47/905; B25J 9/1682; B25J 9/1687; G05D 1/0287; G05D 1/0297; B07C 5/36; B07C 5/34
See application file for complete search history.

(56) References Cited

U.S. PATENT DOCUMENTS

| | | | |
|---|---|---|---|
| 2013/0173049 A1* | 7/2013 | Brunner | G06Q 10/08 700/216 |
| 2017/0113352 A1 | 4/2017 | Lutz et al. | |
| 2017/0336780 A1 | 11/2017 | Wise et al. | |
| 2018/0082162 A1 | 3/2018 | Durham et al. | |
| 2018/0111769 A1* | 4/2018 | Yuvaraj | B25J 9/1687 |
| 2018/0127212 A1* | 5/2018 | Jarvis | G05D 1/247 |
| 2018/0305124 A1 | 10/2018 | Guo et al. | |
| 2019/0033837 A1* | 1/2019 | Zanger | G05B 19/41865 |
| 2020/0306973 A1* | 10/2020 | Edwards | B25J 9/1694 |

FOREIGN PATENT DOCUMENTS

| | | |
|---|---|---|
| CN | 206764767 U | 12/2017 |
| CN | 108009611 A | 5/2018 |
| CN | 108137232 A | 6/2018 |
| CN | 207450847 U | 6/2018 |
| CN | 207876576 U | 9/2018 |
| CN | 109592280 A | 4/2019 |
| CN | 110040412 A | 7/2019 |
| CN | 210504192 U | 5/2020 |
| JP | S61206709 A | 9/1986 |
| JP | 2017141102 A | 8/2017 |
| JP | 2018507829 A | 3/2018 |
| WO | 2019/049557 A1 | 3/2019 |

OTHER PUBLICATIONS

The International Search Report mailed Jul. 27, 2020; PCT/CN2020/086531.
The extended European Search Report dated Sep. 22, 2022; Appln. No. 20795920.6.
Japanese Office Action dated Nov. 4, 2022; Appln. No. 2019-563310.
First Japanese Office Action Dated Apr. 1, 2025; Appln. No. 2024-015265.

* cited by examiner

INTELLIGENT WAREHOUSING SYSTEM, PROCESSING TERMINAL, WAREHOUSE ROBOT AND INTELLIGENT WAREHOUSING METHOD

CROSS-REFERENCE TO RELATED APPLICATION

This application is a continuation of International Application No. PCT/CN2020/086531, filed on Apr. 24, 2020, which claims a priority to Chinese Patent Application No. 2019103328307, filed to the China National Intellectual Property Administration on Apr. 24, 2019 and titled "Intelligent Warehousing System, Processing Terminal, Warehouse robot and Intelligent Warehousing Method". Both of them are hereby incorporated by reference in their entireties in this application.

TECHNICAL FIELD

The present application relates to the field of intelligent warehousing technology, and in particular to an intelligent warehousing system, a processing terminal, a warehouse robot and an intelligent warehousing method.

BACKGROUND

Intelligent warehousing is a link in a logistics process, the application of intelligent warehousing ensures the speed and accuracy of data input in links of materials warehouse management, ensuring that an enterprise can accurately grasp real data of stock in time, and reasonably keeping and controlling the stock of the enterprise. Through scientific coding, it is also convenient to manage batches and shelf lives of stocked materials. Using a warehouse location management function of a system, it is possible to more timely grasp current locations of all stocked materials, which is conducive to improve the efficiency of warehouse management.

In recent years, the technology for handling materials based on warehouse robots has become increasingly mature. In the prior art, a warehouse robot may lift a shelf with materials through a lifting disc on the top thereof, and travel forward by scanning two-dimension codes on the ground, so that the shelf where order materials are located can be handled to a manual processing area.

However, in a process of implementing the present application, the present inventor found that current intelligent warehousing system cannot be fully automated yet, having a low efficiency.

SUMMARY

In order to solve the above technical problem, embodiments of the present application provide an intelligent warehousing system, a processing terminal, a warehouse robot, and an intelligent warehousing method, which can realize automation, thereby improving efficiency.

In order to solve the above technical problem, the embodiments of the present application provide the following technical solution:

an intelligent warehousing system is provided, where the intelligent warehousing system includes: a warehouse robot and a material fetching device;
the warehouse robot includes a first warehouse robot and/or a second warehouse robot;

the first warehouse robot is configured to receive a first scheduling instruction, and handle a material box to a first target position according to the first scheduling instruction;

the second warehouse robot is configured to receive a second scheduling instruction, and handle a portable shelf to a second target position according to the second scheduling instruction; and the material fetching device is configured to receive a material fetching instruction, and fetch a material from the material box and/or the portable shelf according to the material fetching instruction.

In some embodiments, the first warehouse robot includes at least one storage unit, or at least one handling component; or both;

the storage unit is configured to store the material box; and the handling component is configured to handle the material box.

In some embodiments, when the first warehouse robot includes at least one storage unit and at least one handling component, the handling component is configured to fetch the material box from the storage unit, and/or place the material box in the storage unit.

In some embodiments, the first warehouse robot further includes: a lifting component;

the lifting component is configured to drive the at least one storage unit and/or the at least one handling component to move, so as to adjust the at least one storage unit and/or the at least one handling component to a preset height.

In some embodiments, when the first warehouse robot includes the handling component and the lifting component,
the first warehouse robot is further configured to:
receive at least one first material fetching instruction, and each first material fetching instruction corresponds to at least one material box;
adjust the at least one material box to the preset height according to each first material fetching instruction;
the material fetching device is further configured to:
receive at least one second material fetching instruction, and fetch the material from the material box according to each second material fetching instruction.

In some embodiments, when the first warehouse robot includes the handling component, the lifting component, and at least one storage unit,
the first warehouse robot is further configured to:
receive at least one first material fetching instruction, each first material fetching instruction corresponds to at least one material box and at least one storage unit;
fetch at least one material box from corresponding at least one storage unit according to each first material fetching instruction; and
the material fetching device is further configured to:
receive at least one second material fetching instruction, and fetch the material from the material box according to each second material fetching instruction.

In some embodiments, the first warehouse robot is further configured to:
place the material box back into the storage unit corresponding to the material box after the material fetching device completes fetching of the material from the material box.

In some embodiments, the first warehouse robot is further configured to:
adjust a fetched material box to a preset height.

In some embodiments, the material fetching instruction includes at least one third material fetching instruction, and each third material fetching instruction corresponds to at least one material box; then the material fetching device is further configured to:
receive at least one third material fetching instruction, and fetch the material from corresponding at least one material box according to each third material fetching instruction.

In some embodiments, when the first warehouse robot includes at least one storage unit, and each third material fetching instruction corresponds to at least one material box and at least one storage unit; then the material fetching device is further configured to:
receive at least one third material fetching instruction, and fetch the material from at least one material box of corresponding at least one storage unit according to each third material fetching instruction.

In some embodiments, the material fetching instruction includes at least one fourth material fetching instruction; then the material fetching device is further configured to:
receive at least one fourth material fetching instruction, and fetch the material from the portable shelf according to each fourth material fetching instruction.

In some embodiments, the second warehouse robot is further configured to:
receive at least one fifth material fetching instruction, and each fifth material fetching instruction corresponds to at least one material;
adjust at least one material to a preset height according to each fifth material fetching instruction; and the material fetching device is further configured to:
receive at least one sixth material fetching instruction, and fetch the material from the portable shelf according to each sixth material fetching instruction.

In some embodiments, the material fetching device is further configured to:
detect whether the material box and/or the portable shelf are in a preset safe material fetching position after receiving the material fetching instruction, and if yes, then fetch the material from the material box and/or the portable shelf according to the material fetching instruction.

In some embodiments, the material fetching device is further configured to:
adjust a material fetching position before fetching the material from the material box and/or the portable shelf according to the material fetching instruction.

In some embodiments, the material fetching device is further configured to:
send a material fetching completion instruction after completing material fetching, to enable the first warehouse robot to handle the material box to a third target position, and/or to enable the second warehouse robot to handle the portable shelf to a fourth target position.

In some embodiments, the material fetching device is provided with a material fetching mechanism, and the material fetching mechanism includes a suction nozzle component and/or a gripper component; and the material fetching device is configured to fetch the material from the material box and/or the portable shelf through the material fetching mechanism.

In some embodiments, the material fetching device includes: a mechanical arm and a mechanical controller; and the mechanical controller is built in or placed outside the mechanical arm, and the mechanical controller is connected to the mechanical arm;

the mechanical controller is configured to control the mechanical arm to fetch the material from the material box and/or the portable shelf according to the material fetching instruction.

In some embodiments, the material fetching device further includes: a sensor; and the sensor is connected to the mechanical controller.

In some embodiments, the intelligent warehousing system further includes: a workstation; and the material fetching device is provided on the workstation, and the first target position and the second target position are located in a preset area of the workstation.

In some embodiments, the intelligent warehousing system further includes: a sorting device, and the sorting device includes a putwall and/or a transmission belt; then the material fetching device is further configured to:
receive a seventh material fetching instruction, and place the material fetched from the material box and/or the portable shelf to the sorting device according to the seventh material fetching instruction.

In some embodiments, the intelligent warehousing system further includes: an immobile shelf and/or the portable shelf; and the immobile shelf is configured to store the material box;
the portable shelf is configured to store at least one of a pallet, the material box, and the material;
the material box is configured to store the material; and
the pallet is configured to hold the material and/or the material box.

In some embodiments, the intelligent warehousing system further includes: a processing terminal; and the processing terminal is configured to send the first scheduling instruction to the first warehouse robot, so that the first warehouse robot handles the material box to the first target position according to the first scheduling instruction;
and/or,
the processing terminal is configured to send the second scheduling instruction to the second warehouse robot, so that the second warehouse robot handles the portable shelf to the second target position according to the second scheduling instruction; and
the processing terminal is further configured to send the material fetching instruction to the material fetching device, so that the material fetching device fetches the material from the material box and/or the portable shelf according to the material fetching instruction.

In order to solve the above technical problem, the embodiments of the present application also provide the following technical solution:

an intelligent warehousing method is provided, which is applied to a processing terminal, where the intelligent warehousing method includes:
sending a first scheduling instruction to a first warehouse robot, so that the first warehouse robot handles a material box to a first target position according to the first scheduling instruction; and/or, sending a second scheduling instruction to a second warehouse robot, so that the second warehouse robot handles a portable shelf to a second target position according to the second scheduling instruction; and
sending a material fetching instruction to a material fetching device, so that the material fetching device fetches a material from the material box and/or the portable shelf according to the material fetching instruction.

In some embodiments, the first warehouse robot includes a handling component and a lifting component, the handling component is configured to handle the material box, and the lifting component is configured to drive the handling component to move, so as to adjust the handling component to a preset height; then the intelligent warehousing method further includes:

sending at least one first material fetching instruction to the first warehouse robot, with each first material fetching instruction corresponding to at least one material box, so that the first warehouse robot adjusts at least one material box to a preset height according to each first material fetching instruction; and sending the material fetching instruction to the material fetching device so that the material fetching device fetches the material from the material box and/or the portable shelf according to the material fetching instruction specifically includes:

sending at least one second material fetching instruction to the material fetching device, so that the material fetching device fetches the material from the material box according to each second material fetching instruction.

In some embodiments, the first warehouse robot includes the handling component, the lifting component, and at least one storage unit, the storage unit is configured to store the material box, and the handling component is configured to fetch the material box from the storage unit and/or place the material box in the storage unit, and the lifting component is configured to drive the handling component to move relative to the storage unit; then the intelligent warehousing method further includes:

sending at least one first material fetching instruction to the first warehouse robot, with each first material fetching instruction corresponding to at least one material box and at least one storage unit, so that the first warehouse robot fetches at least one material box from corresponding at least one storage unit according to each first material fetching instruction; and sending the material fetching instruction to the material fetching device so that the material fetching device fetches the material from the material box and/or the portable shelf according to the material fetching instruction specifically includes:

sending at least one second material fetching instruction to the material fetching device, so that the material fetching device fetches the material from the material box according to each second material fetching instruction.

In some embodiments, the material fetching instruction includes at least one third material fetching instruction, and each third material fetching instruction corresponds to at least one material box; then sending the material fetching instruction to the material fetching device so that the material fetching device fetches the material from the material box and/or the portable shelf according to the material fetching instruction specifically includes:

sending at least one third material fetching instruction to the material fetching device, so that the material fetching device fetches the material from corresponding at least one material box according to each third material fetching instruction.

In some embodiments, when the first warehouse robot includes at least one storage unit, each third material fetching instruction corresponds to at least one material box and at least one storage unit; then sending at least one third material fetching instruction to the material fetching device so that the material fetching device fetches the material from the material box according to each third material fetching instruction specifically includes:

sending at least one third material fetching instruction to the material fetching device, so that the material fetching device fetches the material from at least one material box of corresponding at least one storage unit according to each third material fetching instruction.

In some embodiments, the material fetching instruction includes at least one fourth material fetching instruction; then sending the material fetching instruction to the material fetching device so that the material fetching device fetches the material from the material box and/or the portable shelf according to the material fetching instruction specifically includes:

sending at least one fourth material fetching instruction to the material fetching device, so that the material fetching device fetches the material from the portable shelf according to each fourth material fetching instruction.

In some embodiments, the intelligent warehousing method further includes:

sending at least one fifth material fetching instruction to the second warehouse robot, with each fifth material fetching instruction corresponding to at least one material, so that the second warehouse robot adjusts at least one material to a preset height according to each fifth material fetching instruction; and sending the material fetching instruction to the material fetching device so that the material fetching device fetches the material from the material box and/or the portable shelf according to the material fetching instruction specifically includes:

sending at least one sixth material fetching instruction to the material fetching device, so that the material fetching device fetches the material from the portable shelf according to each sixth material fetching instruction.

In some embodiments, the intelligent warehousing method further includes:

receiving a material fetching completion instruction sent by the material fetching device; and instructing the first warehouse robot to handle the material box to a third target position according to the material fetching completion instruction; and/or instructing the second warehouse robot to handle the portable shelf to a fourth target position according to the material fetching completion instruction.

In some embodiments, the intelligent warehousing method further includes:

sending a seventh material fetching instruction to the material fetching device, so that the material fetching device places the material fetched from the material box and/or the portable shelf to a sorting device according to the seventh material fetching instruction.

In order to solve the above technical problem, the embodiments of the present application also provide the following technical solution:

an intelligent warehousing method, which is applied to a warehouse robot, the warehouse robot including at least one first warehouse robot, where the intelligent warehousing method includes:

receiving a first scheduling instruction, and handling a material box to a first target position according to the first scheduling instruction, so that a material fetching device fetches a material from the material box according to a material fetching instruction after receiving the material fetching instruction.

In some embodiments, the first warehouse robot includes a handling component and a lifting component, the handling component is configured to handle the material box, and the lifting component is configured to drive the handling component to move, so as to adjust the handling component to a preset height; then the intelligent warehousing method further includes:
receiving at least one first material fetching instruction, wherein each first material fetching instruction corresponds to at least one material box;
adjusting at least one material box to a preset height according to each first material fetching instruction.

In some embodiments, the first warehouse robot includes a handling component, a lifting component, and at least one storage unit, the storage unit is configured to store the material box, and the handling component is configured to fetch the material box from the storage unit and/or place the material box in the storage unit, and the lifting component is configured to drive the handling component to move relative to the storage unit; then the intelligent warehousing method further includes:
receiving at least one first material fetching instruction, wherein each first material fetching instruction corresponds to at least one material box and at least one storage unit; and
fetching at least one material box from corresponding at least one storage unit according to each first fetching instruction.

In some embodiments, the intelligent warehousing method further includes:
placing the material box back into the storage unit corresponding to the material box after the material fetching device completes fetching of the material from the material box.

In some embodiments, the intelligent warehousing method further includes:
adjusting a fetched material box to a preset height.

In order to solve the above technical problem, the embodiments of the present application also provide the following technical solution:
a processing terminal is provided, including:
at least one processor; and,
a memory communicatively connected with the at least one processor; where the memory stores instructions executable by the at least one processor, and the instructions are executed by the at least one processor, to enable the at least one processor to execute the intelligent warehousing method described above.

In order to solve the above technical problem, the embodiments of the present application also provide the following technical solution:
a warehouse robot is provided, which includes at least one first warehouse robot, and the first warehouse robot includes:
at least one processor; and,
a memory communicatively connected with the at least one processor; where the memory stores instructions executable by the at least one processor, and the instructions are executed by the at least one processor, to enable the at least one processor to execute the intelligent warehousing method described above.

In order to solve the above technical problem, the embodiments of the present application also provide the following technical solution:
a non-volatile computer-readable storage medium is provided, the non-volatile computer-readable storage medium stores computer-executable instructions, and the computer-executable instructions are used to enable a processing terminal to execute the intelligent warehousing method described above, or to enable a warehouse robot to execute the intelligent warehousing method described above.

Compared with the prior art, the intelligent warehousing system provided by the embodiments of the present application is capable of realizing automation of warehousing material fetching and placing and thus improving efficiency, by receiving the first scheduling instruction through the first warehouse robot to handle the material box to the first target position, and/or receiving the second scheduling instruction through the second warehouse robot to handle the portable shelf to the second target position, and receiving the material fetching instruction through the material fetching device to fetch the material from the material box and/or the portable shelf.

BRIEF DESCRIPTION OF DRAWINGS

One or more embodiments are exemplarily illustrated by corresponding drawings.

These exemplarily illustrations do not constitute a limitation on the embodiments. Elements with the same reference numerals in the drawings denote similar elements. Unless otherwise stated, the figures in the drawings do not constitute a scale limitation.

DESCRIPTION OF EMBODIMENTS

In order to make the purpose, technical solutions, and advantages of the present application clearer, the present application will further be described in detail with reference to the accompanying drawings and embodiments in the following. It should be understood that specific embodiments described here are only used to explain the present application, rather than to limit the present application.

Unless otherwise defined, all technical and scientific terms used in this specification have the same meaning as commonly understood by those skilled in the technical field to which the present application pertains. The terms used in the specification of the present application in this specification are only for the purpose of describing specific embodiments rather than limiting the present application. The term "and/or" used in this specification includes any and all combinations of one or more related listed items.

An intelligent warehousing system provided herein may be applied to any suitable industry field or technical field, such as intelligent warehousing fields, intelligent logistics fields, intelligent sorting fields, and the like. The embodiments of the present application are described by taking, as an example, an intelligent warehousing system that is applied to the intelligent warehousing field and can perform intelligent material fetching and placing according to material orders.

Embodiment 1

Figure 1:
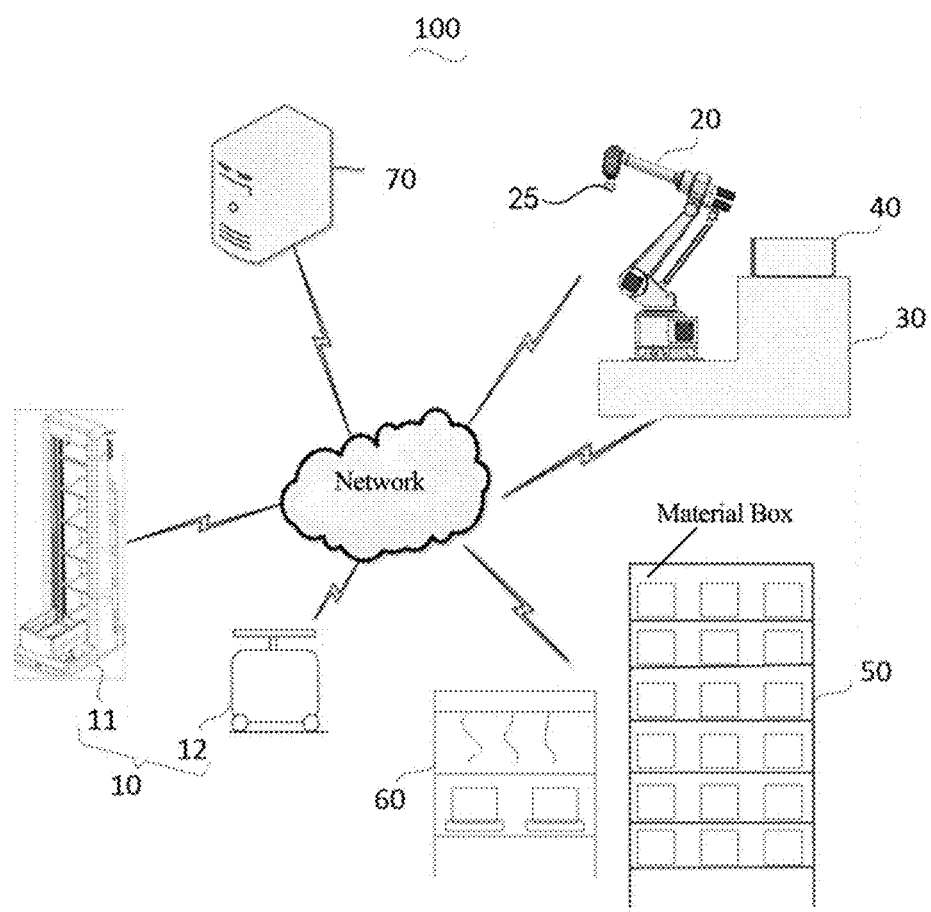
FIG. 1 is a schematic composition diagram of an intelligent warehousing system according to an embodiment of the present application.

FIG. 1 is a schematic composition diagram of an intelligent warehousing system according to an embodiment of the application. Please refer to FIG. 1, the intelligent warehousing system 100 includes a warehouse robot 10 and a material fetching device 20.

The warehouse robot 10 may include one or more robots. Where the warehouse robot 10 may include a first warehouse robot 11 and/or a second warehouse robot 12. Specifically, the warehouse robot 10 includes the first warehouse robot 11, or the warehouse robot 10 includes the second warehouse robot 12, or the warehouse robot 10 includes both the first warehouse robot 11 and the second warehouse robot 12 at the same time.

The first warehouse robot 11 may be configured to fetch and place a material box or a material, and the material box may store the material. In this embodiment, the first warehouse robot 11 is configured to receive a first scheduling instruction, and handle the material box to a first target position according to the first scheduling instruction. Where, the first target position may be preset different positions, such as a material sorting platform or a material transfer platform.

The first warehouse robot 11 has multiple structural forms. In this embodiment, the warehouse robot 10 may include the first warehouse robot 11 in one or more structural forms, such as the first warehouse robots 11 in FIG. 2a to FIG. 2e.

Figure 2A:
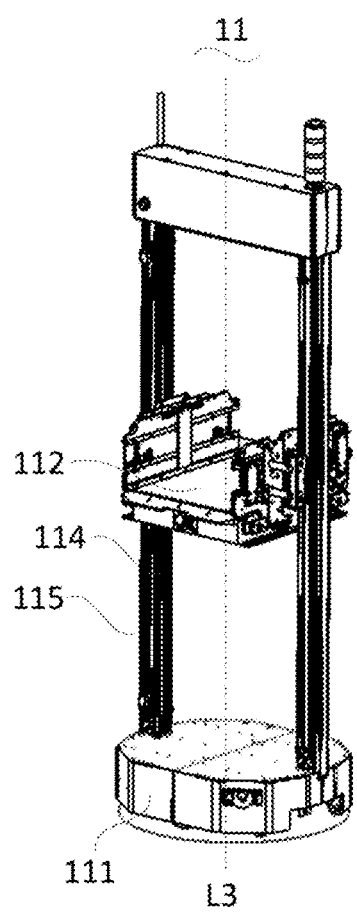
FIG. 2a to FIG. 2e are schematic structural diagrams of a first warehouse robot shown in FIG. 1.

As shown in FIG. 2a, the first warehouse robot 11 includes a mobile chassis 111, at least one storage unit 112, and a support frame 115, where the storage unit 112 is installed on the support frame 115, and the support frame 115 is installed on the mobile chassis 111. Of course, in some other embodiments, the storage unit 112 may also be directly installed on the mobile chassis 111. The mobile chassis 111 is configured to enable the first warehouse robot 11 to move according to a planned path. The storage unit 112 is configured to store a material box. Where the material box may be directly placed on the storage unit 112, and the material box may be manually placed on the storage unit 112, or, in order to make the system more automated, the material box may be placed on the storage unit 112 by additionally providing a mechanical device. As shown in FIG. 2a, when the number of the storage unit 112 is one, the storage unit 112 is directly installed on the support frame 115; in some other embodiments, when the number of the storage unit 112 is multiple, the multiple storage units 112 may be provided by vertically stacking on the supporting frame 115, and a gap may be provided between adjacent storage units 112 to facilitate placing in or fetching the material box. Of course, in some other embodiments, the multiple storage units 112 may also be horizontally provided on the support frame 115.

In an implementation, in the first warehouse robot 11 of FIG. 2a, the first warehouse robot 11 further includes a lifting component 114, where the lifting component 114 is provided on the support frame 115, and the lifting component 114 is respectively connected to the mobile chassis 111 and the storage unit 112. The lifting component 114 is configured to drive the storage unit 112 to move relative to the support frame 115 in a vertical direction L3. In this embodiment, the first warehouse robot 11 is configured to control the lifting component 114 to enable the storage unit 112 to move relative to the support frame 115 in the vertical direction L3, so as to lift the material box on the storage unit 112 to a certain height.

Figure 2B:
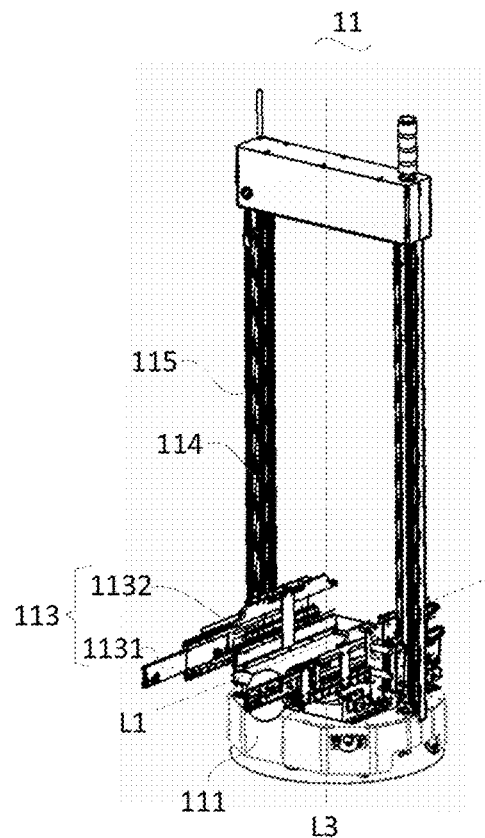

As shown in FIG. 2b, the first warehouse robot 11 may not be provided with a storage unit. The first warehouse robot 11 includes a mobile chassis 111, at least one handling component 113, and a support frame 115, where the handling component 113 is installed on the support frame 115, and the support frame 115 is installed on the mobile chassis 111. Of course, in some other embodiments, the handling component 113 may also be directly installed on the mobile chassis 111. The mobile chassis 111 is configured to enable the first warehouse robot 11 to move according to a planned path. The handling component 113 includes a handling fork 1131 and a telescopic device 1132, where the handling fork 1131 is installed on the telescopic device 1132, and the telescopic device 1132 is configured to drive the handling fork 1131 to move relative to the support frame 115 in a horizontal direction L1, so that the handling fork 1131 may load or unload the material box at any position relative to the support frame 115 in the horizontal direction L1. In this embodiment, the first warehouse robot 11 is configured to control the handling component 113 to fetch and handle the material box, where the first warehouse robot 11 can only fetch one material box at a time.

It can be understood that when the number of the handling component 113 is one, the handling component 113 is directly installed on the support frame 115; in some other embodiments, when the number of the handling component 113 is multiple, the multiple handling components 113 may be provided by vertically stacking on the supporting frame 115, a gap may be provided between adjacent handling components 113 to facilitate placing or fetching of the material box. Of course, in some other embodiments, the multiple handling components 113 may also be horizontally provided on the support frame 115.

In an implementation, in the first warehouse robot 11 of FIG. 2b, the first warehouse robot 11 further includes a lifting component 114, where the lifting component 114 is provided on the support frame 115, and the lifting component 114 is respectively connected to the mobile chassis 111 and the handling component 113. The lifting component 114 is configured to enable the handling component 113 to move relative to the mobile chassis 111 in a vertical direction. The first warehouse robot 11 is further configured to control the lifting component 114 to enable the handling component 113 to move relative to the support frame 115 in the vertical direction L3, so as to lift the material box on the handling component 113 to a certain height.

Figure 2C:
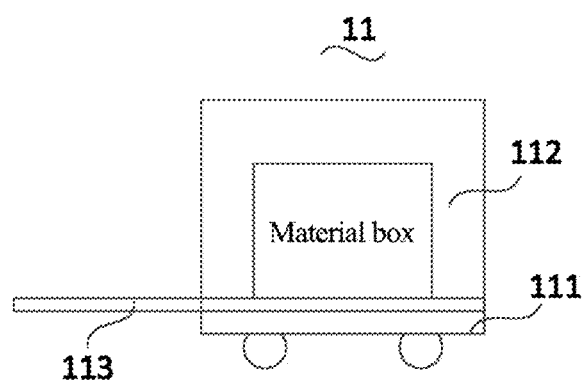
Figure 2D:
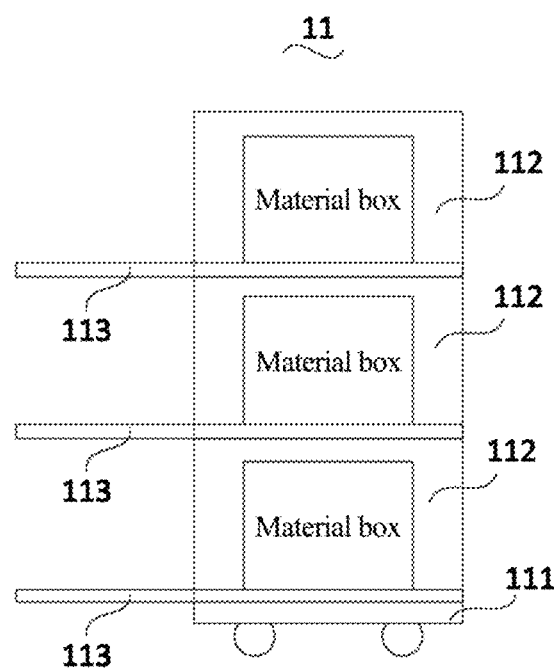

As shown in FIG. 2c and FIG. 2d, the first warehouse robot 11 includes a mobile chassis 111, at least one storage unit 112, at least one handling component 113, and a support frame (not shown), where the support frame is installed on the mobile chassis 111, the storage unit 112 is installed on the support frame, and the handling component 113 is installed on the storage unit 112, and one handling component 113 corresponds to one storage unit 112. The mobile chassis 111 is configured to enable the first warehouse robot 11 to move according to a planned path. The storage unit 112 is configured to store the material box. The handling component 113 has the same structure as the handling component in FIG. 2b, and will not be repeated here. The difference is that the handling component 113 is installed on the storage unit 112 and thus is movable relative to the storage unit 112. In this embodiment, the first warehouse robot 11 is configured to: control the handling component 113 to fetch the material box from the storage unit 112; and/or control the handling component 113 to place the material box in the storage unit 112. As shown in FIG. 2c, when the number of the storage unit 112 and the number of the handling component 113 are both one, the storage unit 112 is directly installed on the support frame, and the handling component 113 is installed on the storage unit 112; as shown in FIG. 2d, when the number of the storage unit 112 and the number of the handling component 113 are both multiple, the multiple storage units 112 are provided by vertically stacking on the support frame, and one handling component 113 is correspondingly installed on one storage unit 112. The handling components 113 may be each extended in a horizontal direction, thereby achieving fetching and placing of the material box.

In an implementation, in the first warehouse robot 11 shown in FIG. 2c and FIG. 2d, the first warehouse robot 11 may further include a lifting component (not shown), where the lifting component is provided on the support frame, and the lifting component is respectively connected to the mobile chassis 111 and the storage unit 112. The lifting component is configured to drive the storage unit 112 to move relative to the support frame in a vertical direction, so as to drive the handling component 113 to move relative to the support frame in the vertical direction.

Figure 2E:
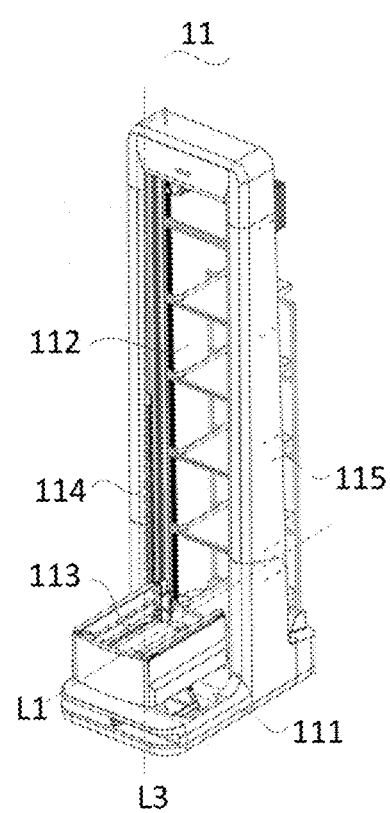

As shown in FIG. 2e, the first warehouse robot 11 includes a mobile chassis 111, at least one storage unit 112, a handling component 113, a lifting component 114 and a supporting frame 115. The supporting frame 115 is installed on the mobile chassis 111, the storage unit 112 is installed on the supporting frame 115, the lifting component 114 is installed on the support frame 115, and the lifting component 114 is connected to the handling component 113. The mobile chassis 111 is configured to enable the first warehouse robot 11 to move according to a planned path. The storage unit 112 is configured to store the material box. The handling component 113 has the same structure as the handling component in FIG. 2b, and will not be repeated here. The difference is that the handling component 113 is installed on the support frame 115, and the handling component 113 may move relative to the storage unit 112 in the vertical direction L3. The lifting component 114 is connected to the handling component 113, and the lifting component 114 is configured to drive the handling component 113 to move relative to the storage unit 112 in the vertical direction L3. In addition, a handling fork 1131 of the handling component 113 may also move relative to the storage unit 112 in the horizontal direction L1. In this embodiment, the first warehouse robot 11 is configured to: control the handling component 113 to fetch the material box from the storage unit 112; and/or control the handling component 113 to place the material box in the storage unit 112. The first warehouse robot 11 is further configured to: control the lifting component 114 to enable the handling component 113 to move relative to the storage unit 112, so as to enable one handling component 113 to shuttle between multiple storage units 112, so that the material boxes obtained by the handling component 113 may be stored in the storage units 112 or the material boxes in the storage units 112 may be fetched through one handling component 113.

It should be noted that, in this embodiment, the lifting component enables the handling component and/or the storage unit to move to the preset height, and the "preset height" may be a height set by the first warehouse robot according to a received instruction.

The second warehouse robot 12 is configured to move a portable shelf, where the portable shelf may store a material box, a material and/or a pallet. Where the portable shelf may be single-layered or multi-layered. When the portable shelf is the multi-layered, multiple material boxes and/or pallets may be placed on different layers of the portable shelf; when the portable shelf is the single layered, the material box and/or the pallet may be placed on top of the portable shelf. In this embodiment, the second warehouse robot 12 is configured to receive a second scheduling instruction, and handle the portable shelf to a second target position according to the second scheduling instruction. Where the second target position may be preset different positions, such as a material sorting platform or a material transfer platform.

Figure 3:
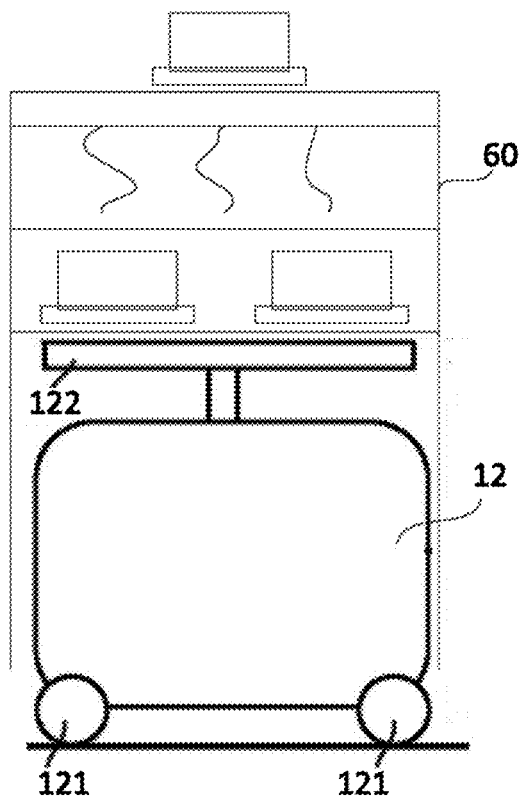
FIG. 3 is a schematic structural diagram of a second warehouse robot shown in FIG. 1.

The second warehouse robot 12 may be a robot with a lifting mechanism on the top, which may be configured to lift the shelf so as to handle the shelf. For example, the second warehouse robot 12 may be a top-lifting robot or other robots with a similar top-lifting structure. In this embodiment, as shown in FIG. 3, the second warehouse robot 12 includes a driving mechanism 121 and a top-lifting mechanism 122, where the driving mechanism 121 may drive the second warehouse robot 12 to be moveable in a working space, such as a warehouse, and the top-lifting mechanism 122 is configured to handle the portable shelf, and when the top-lifting mechanism 122 is raised, the portable shelf may be lifted from the ground, and when the top-lifting mechanism 122 is lowered, the portable shelf may be placed on the ground.

The material fetching device 20 is an automated mechanical device, for example, it may be a six-degree-of-freedom mechanical device, which can be accurately positioned to a certain point in a three-dimensional (or two-dimensional) space to work. In this embodiment, the material fetching device 20 is configured to receive a material fetching instruction, and fetch the material from the material box and/or the portable shelf according to the material fetching instruction. Where when the warehouse robot 10 includes the first warehouse robot 11, the material fetching device 20 is located at the first target position; when the warehouse robot 10 includes the second warehouse robot 12, the material fetching device 20 is located at the second target position; and when the warehouse robot 10 includes both the first warehouse robot 11 and the second warehouse robot 12, the material fetching device 20 is located at an intermediate position between the first target position and the second target position, so that the material fetching device 20 can fetch the material. Where, the first target position and the second target position may be the same position, and the first warehouse robot 11 and the second warehouse robot 12 may arrive at the same position successively, so that the material fetching device 20 fetches the materials in an order of arrival. Automatically fetching and placing the material is achieved by using the material fetching device 20 in the intelligent warehousing system 100, which can improve the automation, thereby improving efficiency.

In an implementation, in some other embodiments, the material fetching device 20 is further configured to fetch the material from the material box and/or the portable shelf.

Figure 4:
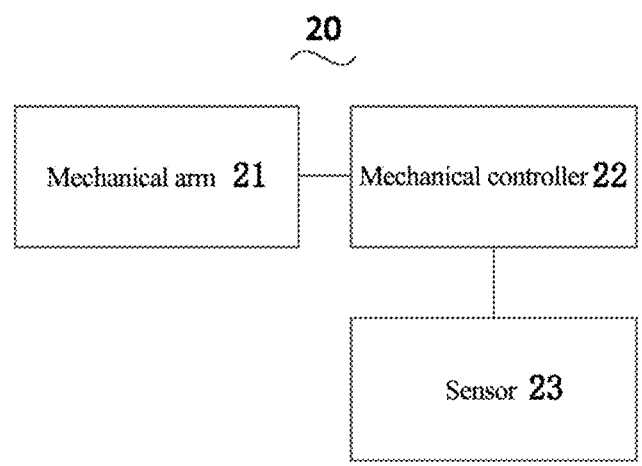
FIG. 4 is a schematic diagram of a hardware structure of a material fetching device shown in FIG. 1.

As shown in FIG. 4, the material fetching device 20 includes a mechanical arm 21 and a mechanical controller 22. The mechanical arm 21 may be a joint mechanical arm, for example, a 5-joint mechanical arm. The mechanical arm 21 includes several arm parts and several rotation joints, and every two adjacent arm parts are connected by the rotation joint. The rotation joints are configured to drive rotation and/or swing of the arm parts, so as to realize the movement of the mechanical arm 21. The mechanical controller 22 may be a control chip or a control circuit, or the like. The mechanical controller 22 is connected to the rotation joints of the mechanical arm 21, and the mechanical controller 22 is configured to control the movement of the mechanical arm 21, and the mechanical controller 22 can control the mechanical arm 21 to fetch the material from the material box and/or the portable shelf according to the material fetching instruction. Where, the mechanical controller 22 may be built in the mechanical arm 21 or placed outside the mechanical arm 21.

The material fetching device 20 further includes a sensor 23. The sensor 23 is provided on the mechanical arm 21, and the sensor 23 may be an image sensor for collecting image information. The mechanical controller 22 is connected to the sensor 23, and the mechanical controller 22 is configured to process the image information collected by the sensor 23, and control the movement of the mechanical arm 21 according to a processing result. Of course, in some other embodiments, the material fetching device 20 may also include other sensors, such as a depth sensor, an acceleration sensor, and the like, which can be selected according to actual conditions.

The material fetching device 20 is provided with a material fetching mechanism 25, and the material fetching mechanism 25 is configured to achieve grabbing of the material, and the material fetching device 20 fetches the material from the material box and/or the portable shelf through the material fetching mechanism 25. The material fetching mechanism 25 includes a suction nozzle component and/or a gripper component (not shown), where the suction nozzle component may be a sponge suction nozzle, which is configured to fetch large-area materials such as clothes and cloth, and the gripper component may has an imitated finger joint structure, which is configured to grab materials such as daily necessities.

The intelligent warehousing system 100 may further include a workstation 30. The material fetching device 20 may be provided on the workstation 30, then the first target position and the second target position may be located in a preset area of the workstation 30. The workstation 30 may be configured to receive or send control instructions to control the mechanical arm 21, so that the material fetching device 20 can achieve fetching and placing of the material.

The intelligent warehousing system 100 may further include a sorting device 40. The sorting device 40 includes a putwall and/or a transmission belt, where both the putwall and the transmission belt may be configured to place the material. The putwall is an immobile mechanism for placing the material, and the transmission belt is a mobile mechanism for placing the material. In this embodiment, the material fetching device 20 is further configured to: receive a seventh material fetching instruction, and place the material fetched from the material box and/or the portable shelf to a corresponding sorting device 40 according to the seventh material fetching instruction. For example, the seventh material fetching instruction includes material placing position information, and after the material fetching device 20 receives the seventh material fetching instruction, the material fetching device 20 fetches the material from the warehouse robot 10 and places the material to a corresponding position of the sorting device 40 according to the material placing position information. In the process of the material fetching device 20 completing the last material fetching and sorting, the warehouse robot 10 may move to a position where the sorting device 40 is located, so that when the sorting device 40 completes the sorting, the warehouse robot 10 handles the material box to a corresponding packaging area or a secondary sorting area.

In an implementation, the sorting device 40 may be provided on the workstation 30, and the workstation 30 may control the sorting device 40, or record material placing information of the material fetching device 20, where the material placing information may be material placing species, material placing quantity and material placing position, and the like. For example, when the material fetching device 20 places a commodity a to position 1 of the putwall, the workstation 30 records "the putwall at position 1, commodity a, quantity 1".

In an implementation, the intelligent warehousing system 100 may further include an immobile shelf 50, and the number of the immobile shelf 50 may be one or more, and each immobile shelf 50 may be provided with one layer or more layers. The immobile shelf 50 is configured to store a material box, so that the first warehouse robot 11 can fetch the material box from the immobile shelf 50 or place the material box on the immobile shelf 50.

In an implementation, the intelligent warehousing system 100 may further include a portable shelf 60. There may also be one or more portable shelves 60, and each portable shelf 60 may be provided with one layer or more layers. The portable shelf 60 is configured to store a material, a material box and/or a pallet, so that the second warehouse robot 12 can handle the material, the material box and/or the pallet on the portable shelf 60 by handling the portable shelf 60. Where the material box is configured to store the material; the pallet is configured to store the material and/or the material box; the material may be a bulky commodity, a pendant commodity or an ordinary commodity, and the ordinary commodity may include a first ordinary commodity and/or a second ordinary commodity, where the first ordinary commodity is stored in the material box, and the second ordinary commodity is directly stored on the portable shelf 60. The second ordinary commodity may be a commodity with a relatively large sales volume, for example, a popular commodity, which may be stored directly on the portable shelf 60 to save time of loading the commodity into the material box.

It should be noted that the immobile shelf 50 and the portable shelf 60 may be provided in the same area, such as a material fetching platform, so that the warehouse robot 10 can fetch the material box or the portable shelf from the material fetching platform. Where, the immobile shelf 50 and the portable shelf 60 may be deployed in a mixed manner, or deployed in different regions.

In an implementation, the intelligent warehousing system 100 may further include a processing terminal 70. In this embodiment, the processing terminal 70 is configured to send a material fetching instruction to the material fetching device 20, so that the material fetching device 20 receives the material fetching instruction and fetches the material from the material box and/or the portable shelf according to the material fetching instruction. The processing terminal 70 is further configured to: send the first scheduling instruction to the first warehouse robot 11, so that the first warehouse robot 11 handles the material box to the first target position according to the first scheduling instruction, and/or, send the second scheduling instruction to the second warehouse robot 12, so that the second warehouse robot 12 handles the portable shelf to the second target position according to the second scheduling instruction.

The processing terminal 70 may be a background server, a computer device with a processing capability, or a terminal device with a computing function or a scheduling function. The processing terminal 70 may communicate with the warehouse robot 10, the material fetching device 20, and/or the workstation 30 through a network connection so as to perform information interaction, for example, sending a scheduling instruction. Furthermore, the processing terminal 70 may also include external data and information, such as material fetching order information, position information, and various correspondence information. When the processing terminal 70 sends a scheduling instruction, it usually needs to determine a position where the material is located according to information of material fetching and placing and associated information of the material storing, and instruct the corresponding warehouse robot to perform material fetching and placing. For example, when a material of a material fetching order is located on the immobile shelf, the processing terminal 70 sends the first scheduling instruction to instruct the first warehouse robot 11 to move to the immobile shelf to fetch the material; and when the material of the material fetching order is on the portable shelf, the processing terminal 70 sends the second scheduling instruction to instruct the second warehouse robot 12 to move to the portable shelf to fetch the material. Where, the scheduling instruction may include a receiving object of the instruction, a traveling route of the receiving object, and specific execution content contained in the instruction. The receiving object may include the first warehouse robot 11 or the second warehouse robot 12, the traveling route may include a starting position, a traveling trajectory, and a target position, and the specific execution content may include material fetching or placing, or the like.

In order to realize the material fetching and placing of the warehouse robot 10, the processing terminal 70 may store the associated information of the material storing, and the associated information of the material storing includes at least one of the following information: material identification information, material box identification information, shelf identification information, position information of the shelf for placing the material, position information of the material box for storing the material, a corresponding relationship between the shelf and the material box, a corresponding relationship between the shelf and the material, and a corresponding relationship between the material box and the material. Where, the material identification information may be various codes on the material, such as two-dimension code, barcode or SKU (Stock Keeping Unit) information, and the code information may include any one attribute or more attributes of attributes for example brand, model, configuration, level, color, packaging capacity, unit, production date, shelf life, use, price, and place of origin.

The intelligent warehousing system 100 provided by the embodiments of the present application can realize the automation of material fetching and placing in the warehouse and thus improve efficiency, by receiving the first scheduling instruction through the first warehouse robot 11 to handle the material box to the first target position, and/or receiving the second scheduling instruction through the second warehouse robot 12 to handle the portable shelf to the second target position, and receiving the material fetching instruction through the material fetching device 20 to fetch the material from the material box and/or the portable shelf.

Embodiment 2

Figure 5:
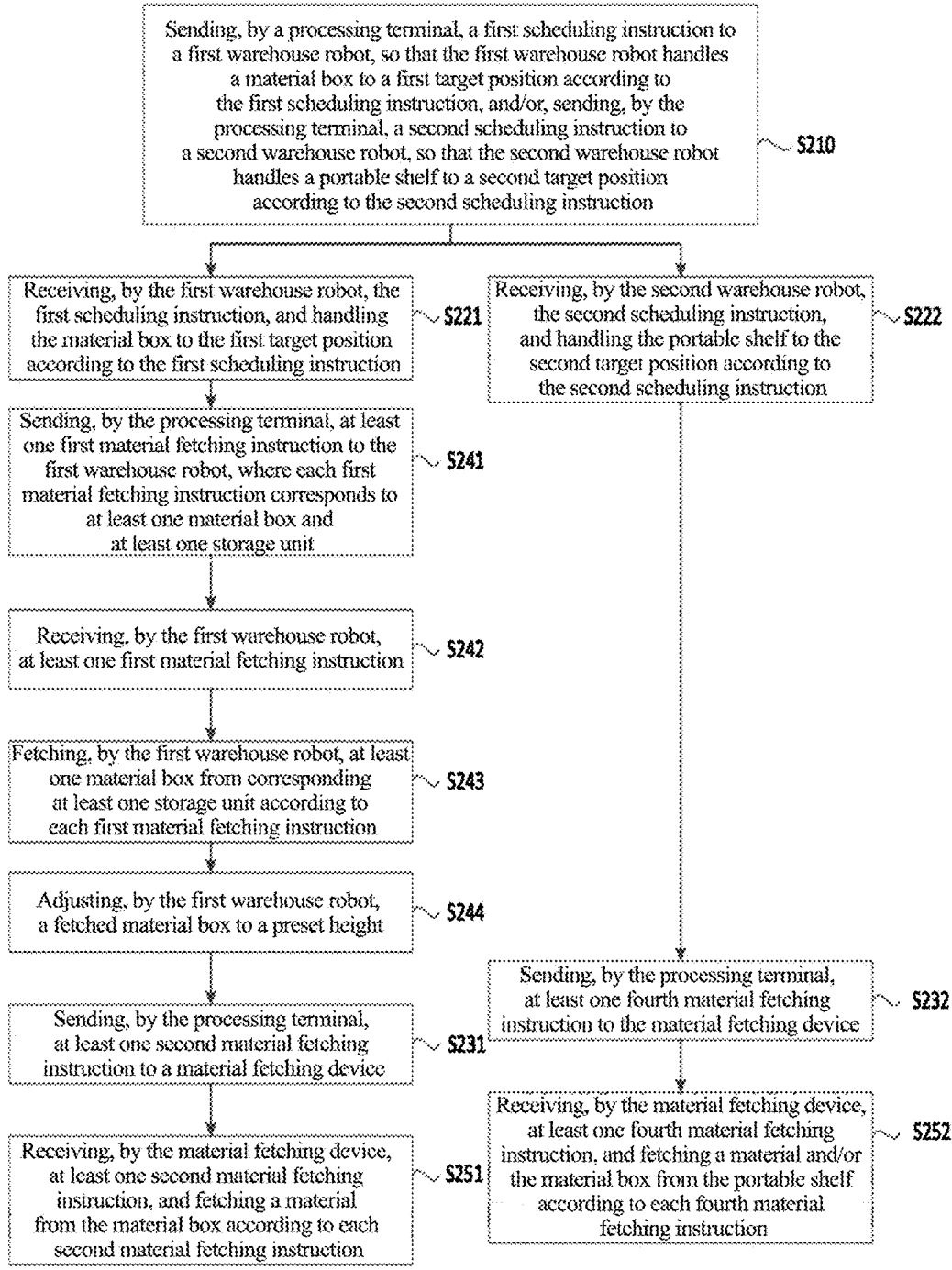
FIG. 5 is a schematic flowchart of a first intelligent warehousing method applied to the intelligent warehousing system shown in FIG. 1 according to an embodiment of the present application.

FIG. 5 is a schematic flowchart of a first intelligent warehousing method applied to the intelligent warehousing system shown in FIG. 1 according to an embodiment of the application. Please refer to FIG. 5, the intelligent warehousing method may include but is not limited to the following steps:

S210, sending, by a processing terminal, a first scheduling instruction to a first warehouse robot, so that the first warehouse robot handles a material box to a first target position according to the first scheduling instruction, and/or, sending, by the processing terminal, a second scheduling instruction to a second warehouse robot, so that the second warehouse robot handles a portable shelf to a second target position according to the second scheduling instruction.

In this embodiment, the "scheduling instruction" is used to indicate movement of the warehouse robot. For example, the scheduling instruction may include starting and ending information, moving route information, and the like. The "first target position" and the "second target position" are position areas close to a mechanical arm, so that the mechanical arm can achieve convenient material fetching. Specifically, when the intelligent warehousing system only includes the first warehouse robot, the processing terminal sends the first scheduling instruction to the first warehouse robot; when the intelligent warehousing system only includes the second warehouse robot, the processing terminal sends the second scheduling instruction to the second warehouse robot; and when the intelligent warehousing system includes both the first warehouse robot and the second warehouse robot, the processing terminal may send the first scheduling instruction and the second scheduling instruction simultaneously or successively. For example, when the first target position and the second target position are the same position, the processing terminal sends the first scheduling instruction and the second scheduling instruction successively, so that the first warehouse robot and the second warehouse robot are not at the same position at the same time.

The scheduling instruction may further include material fetching and placing information. Before S210, the method may further include: acquiring, by the processing terminal, the material fetching and placing information, and sending the first scheduling instruction and/or the second scheduling instruction according to the material fetching and placing information.

The material fetching and placing information may include order information of a material to be fetched or information of a material that is need to be put on a shelf. These material information may be SKU information of the material, and when there is a need to fetch a material, the SKU information of the material on an order may be acquired, the information may include name, model, quantity, style, and the like of the material to be fetched. When there is a material that needs to be put on the shelf, the material may be stored in the material box or the shelf, and relationships among the material information and the material box and the shelf may be established, for example, a corresponding relationship between the SKU information of the material and material box identification information, a corresponding relationship between the SKU information of the material and shelf identification information, and a corresponding relationship between the material box identification information and the shelf identification information. In addition, when the material is put on the shelf and placed in a designated target position, position information is stored. The position information may include specific position information of the shelf where the material is stored, and specific position information of the material box where the material is stored.

One implementation of sending the first scheduling instruction and/or the second scheduling instruction according to information of material fetching and placing may be: according to the information of material fetching and placing, sending the first scheduling instruction to enable the first warehouse robot to reach a corresponding immobile shelf to fetch the material box and handle the material box to the first target position.

S221, receiving, by the first warehouse robot, the first scheduling instruction, and handling the material box to the first target position according to the first scheduling instruction.

In this embodiment, when the first warehouse robot receives the first scheduling instruction sent by the processing terminal, the first warehouse robot reaches the immobile shelf to fetch the material box according to the information of material fetching and placing contained in the first scheduling instruction, and moves to the first target position according to the moving route information contained in the first scheduling instruction, thereby handling the material box to the first target position.

S222, receiving, by the second warehouse robot, the second scheduling instruction, and handling the portable shelf to the second target position according to the second scheduling instruction.

In this embodiment, when the second warehouse robot receives the second scheduling instruction sent by the processing terminal, the second warehouse robot fetches the portable shelf according to the information of material fetching and placing contained in the second scheduling instruction, and moves to the second target position according to the moving route information contained in the second scheduling instruction, thereby handling the portable shelf to the second target position.

It should be noted that, when the warehouse robot only includes the first warehouse robot, only S221 is executed; when the warehouse robot only includes the second warehouse robot, only S222 is executed; and when the warehouse robot includes both the first warehouse robot and the second warehouse robot, S221 and S222 are both executed, where S221 and S222 may be executed simultaneously or separately. For example, when movements of the first warehouse robot and the second warehouse robot do not affect each other, S221 and S222 are executed simultaneously so as to improve the working efficient.

S230, sending, by the processing terminal, a material fetching instruction to a material fetching device.

In this embodiment, the "fetching instruction" is an instruction used to instruct the material fetching device to perform a material fetching operation. The processing terminal sends the material fetching instruction, which may be directly or indirectly sent. For example, the processing terminal sends the material fetching instruction directly to the material fetching device; or, the processing terminal sends the material fetching instruction to the first warehouse robot and/or the second warehouse robot, and then the first warehouse robot and/or the second warehouse robot send(s) the material fetching instruction to the material fetching device; or, the processing terminal sends the material fetching instruction to a workstation, and then the workstation sends the material fetching instruction to the material fetching device.

The material fetching instruction is also sent to the first warehouse robot. In this embodiment, when the first warehouse robot includes the handling component, the lifting component, and at least one storage unit (as shown in FIG. 2e), the method further includes that:

S241, sending, by the processing terminal, at least one first material fetching instruction to the first warehouse robot, where each first material fetching instruction corresponds to at least one material box and at least one storage unit;

S242, receiving, by the first warehouse robot, the at least one first material fetching instruction;

S243, fetching, by the first warehouse robot, at least one material box from corresponding at least one storage unit according to each first material fetching instruction.

In S241, when the warehouse robot includes the first warehouse robot, the first material fetching instruction is sent to the first warehouse robot. Sending at least one first material fetching instruction to the first warehouse robot may be that: sending one first material fetching instruction at a time, and sending several first material fetching instructions to the first warehouse robot, or sending multiple first material fetching instructions to the first warehouse robot at one time. For example, the processing terminal sends one first material fetching instruction to the first warehouse robot, and after the material fetching device completes an operation corresponding to the first material fetching instruction, the processing terminal sends a next first material fetching instruction to the first warehouse robot; until all first material fetching instructions are sent. For another example, the processing terminal sends multiple first material fetching instructions to the first warehouse robot at a time, so that the first warehouse robot sequentially executes corresponding operations of the multiple first material fetching instructions.

In S241, each first material fetching instruction corresponding to at least one material box and at least one storage unit may be that: one first material fetching instruction includes position information of one storage unit in which one material box is located, or one first material fetching instruction includes position information of multiple storage units where multiple material boxes are located. For example, assuming that a material box a is located in a storage unit 1, a material box b is located in a storage unit 2, and a material box c is located in a storage unit 3, the first material fetching instruction may include position information of the storage unit 2 where the material box b is located.

Figure 6:
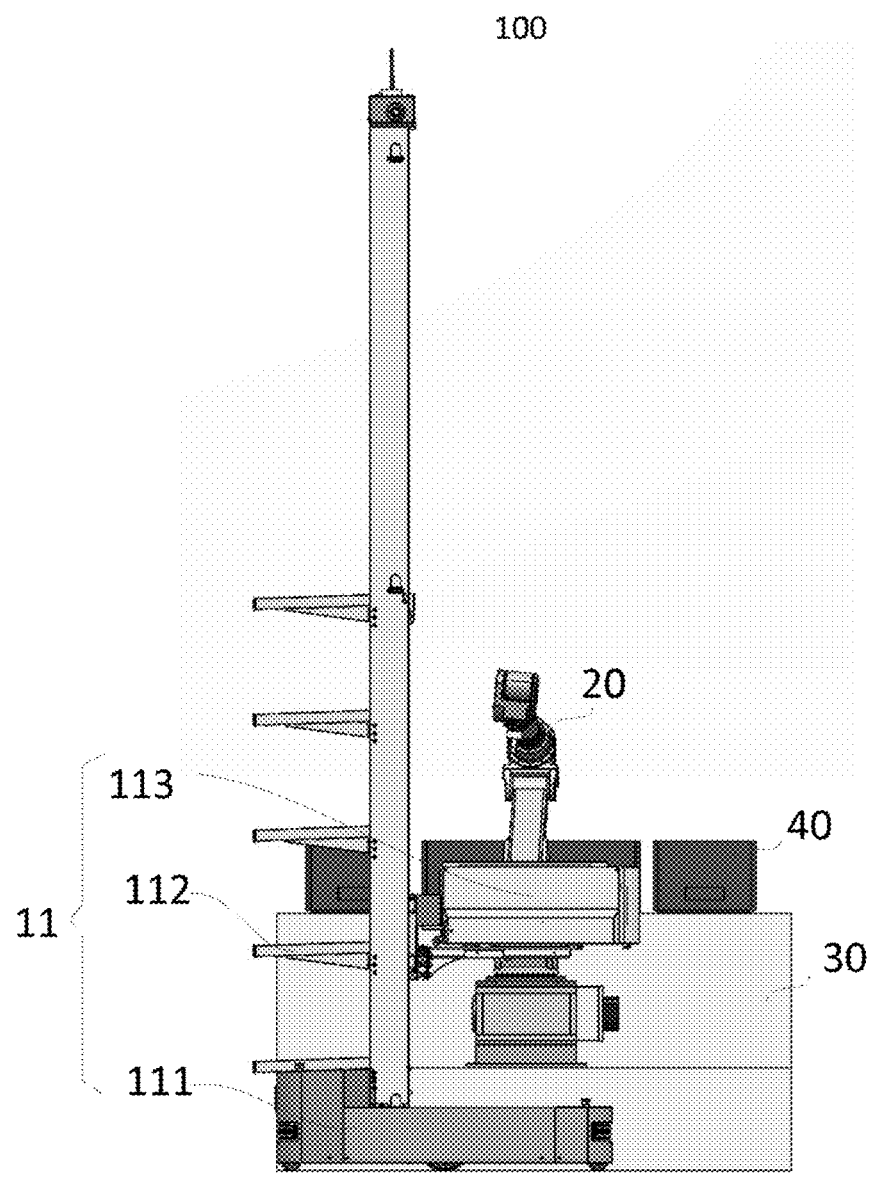
FIG. 6 is a schematic diagram of material fetching of the first intelligent warehousing method applied to the intelligent warehousing system shown in FIG. 1 according to an embodiment of the present application.

In S243, please refer to FIG. 6 together, a specific implementation of S243 may be that: after receiving the first material fetching instruction, the first warehouse robot determines a position of the storage unit according to position information of the storage unit contained in the first material fetching instruction, controls the lifting component to enable the handling component to move relative to the storage unit, so that the handling component moves to a corresponding height of the storage unit corresponding to the position information of the storage unit contained in the first material fetching instruction, and controls the handling component to fetch a material box in the storage unit. For example, assuming that a material box a is located in a storage unit 1, a material box b is located in a storage unit 2, and a material box c is located in a storage unit 3, and the first material fetching instruction corresponds to position information of the storage unit 2, then after the first warehouse robot receives the first material fetching instruction, the first warehouse robot controls the lifting component to enable the handling component to move to a corresponding height of the storage unit 2 and controls the handling component to fetch the material box b in the storage unit 2.

In an implementation, after S243, the method further includes: S244, adjusting, by the first warehouse robot, a fetched material box to a preset height. Where, the preset height may be a preset height corresponding to a position of the material fetching device. By adjusting the material box to the preset height, the material fetching device is convenient to fetch the material. For example, assuming that the preset height is 1 meter, and after the first warehouse robot fetches the material box b from the storage unit 2 through the handling component, it controls the lifting component to adjust the handling component to the preset height, so that the material box b moves to the preset height following the handling component, so that the material fetching device may fetch the material.

In an implementation, after S243, the method further includes: placing, by the first warehouse robot, the material box back into the storage unit after the material fetching device completes material fetching from the material box. Where, "completing material fetching from the material box" means that all materials in the material box that need to be fetched are fetched; placing the material box back into the storage unit may be: placing the material box back into the storage unit where the material box was fetched, or, placing the material box in a storage unit closest to the material box. Where, the first warehouse robot may automatically place the material box back into the storage unit after the material fetching device completes material fetching from the material box, or may place the material box back into the storage unit after receiving a relevant instruction. For example, after the first warehouse robot receives the first material fetching instruction and fetches the material box b from the storage unit 2, the material fetching device first fetches a material b1 from the material box b, and then the material fetching device fetches a material b2 from the material box b. The materials b1 and b2 that need to be fetched from the material box b are all fetched, then material fetching of the material box b is completed, and the material box b is automatically placed back into the storage unit 2.

It should be noted that S221 and S241 to S244 may be executed simultaneously, so that the first warehouse robot fetches a material box from a corresponding storage unit while handling a material box, so as to save the time for material fetching.

In an implementation, when the processing terminal sends multiple first material fetching instructions, the method further includes: sending, by the processing terminal, the multiple first material fetching instructions according to a preset priority order; fetching, by the first warehouse robot, successively the material boxes from the corresponding storage units according to a sending order of each first material fetching instruction. Where the preset priority order is an order in which the first warehouse robot is instructed to sequentially fetch the material boxes. For example, assuming that the first warehouse robot includes storage units 1, 2, and 3, and the preset priority order is: the storage unit 2>the storage unit 1>the storage unit 3, then the processing terminal first sends a first material fetching instruction corresponding to the storage unit 2, and then sends a first material fetching instruction corresponding to the storage unit 1, and finally sends a first material fetching instruction corresponding to the storage unit 3, then the first warehouse robot first goes to the storage unit 2 to fetch the material box b, and then goes to the storage unit 1 to fetch the material box a, and finally goes to the storage unit 3 to fetch the material box c. Sending, by the processing terminal, the first material fetching instructions according to the preset priority order enables the first warehouse robot to sequentially fetch the material boxes according to the preset priority order, and enables the material fetching device to fetch the materials without acquiring a material fetching order.

Figure 7:
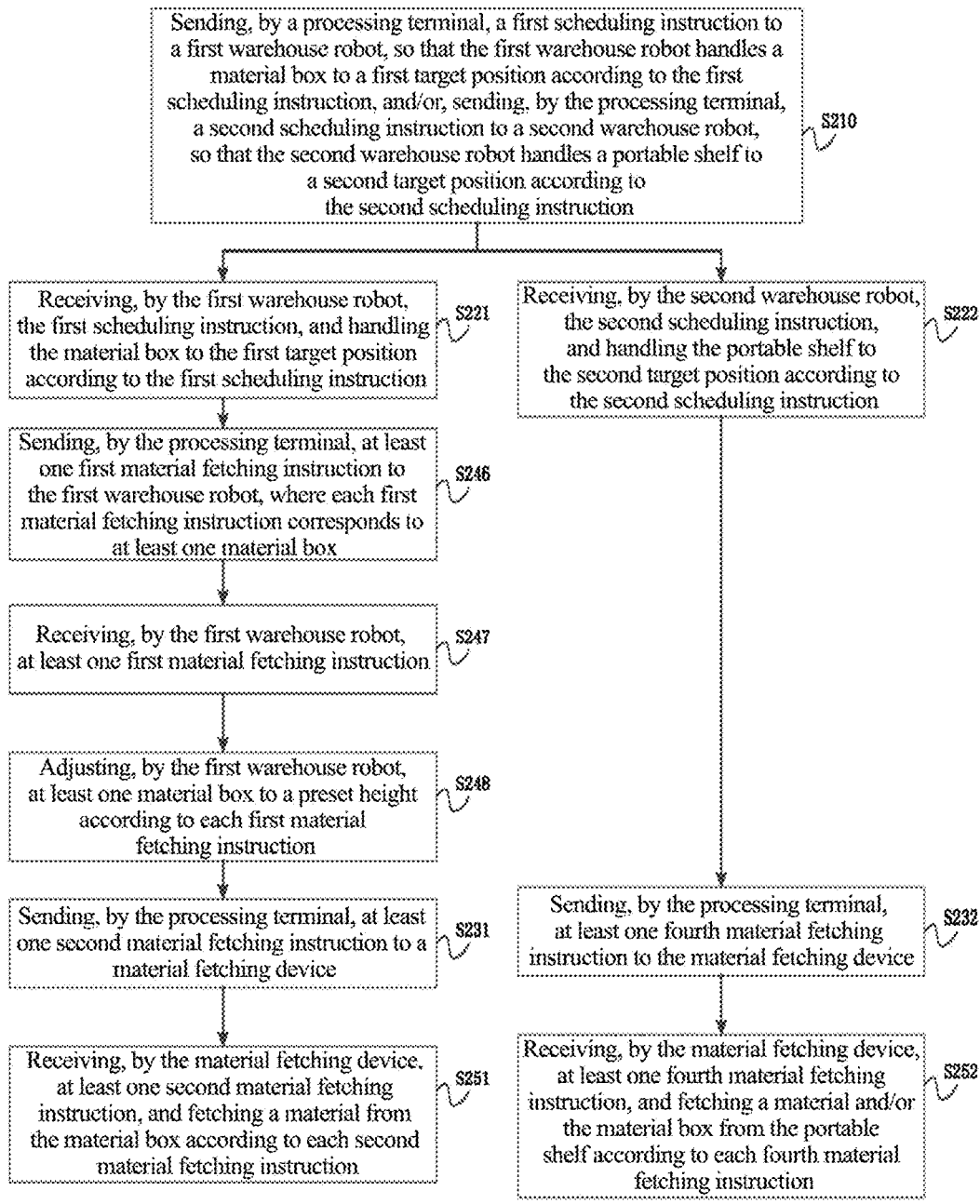
FIG. 7 is a schematic flowchart of a second intelligent warehousing method applied to the intelligent warehousing system shown in FIG. 1 according to an embodiment of the present application.

In an implementation, in some other embodiments, when the first warehouse robot includes a handling component and a lifting component (as shown in FIG. 2b), as shown in FIG. 7, the method further includes:

S246, sending, by the processing terminal, at least one first material fetching instruction to the first warehouse robot, where each first material fetching instruction corresponds to at least one material box;

S247, receiving, by the first warehouse robot, the at least one first material fetching instruction; and S248, adjusting, by the first warehouse robot, the at least one material box to a preset height according to each first material fetching instruction.

In S246, the each first material fetching instruction corresponding to the at least one material box may be that: one first material fetching instruction includes target height information of one or more material boxes. For example, assuming that the material box a is currently located at (0, 0, 1), and the first material fetching instruction contains that the target height information of the material box a is (0, 0, 3).

In S248, when the first warehouse robot receives the first material fetching instruction, the first warehouse robot controls the lifting component to enable the handling component to move to a preset height corresponding to target height information of the material box contained in the first material fetching instruction according to the target height information of the material box contained in the first material fetching instruction, thereby driving the material box on the handling component to move to the preset height, so that the material fetching device directly performs material fetching at the preset height. For example, assuming that the material box a is currently located at (0, 0, 1), and the first material fetching instruction contains that the target position of the material box a is (0, 0, 3), then when the first warehouse robot receives the first material fetching instruction, the first warehouse robot controls the lifting component to move the handling component to (0, 0, 3), thereby adjusting the material box to a preset height.

It should be noted that S221 and S246 to S248 may be executed simultaneously, so that the first warehouse robot fetches a material box from a corresponding storage unit while handling a material box, so as to save the time for material fetching.

S250, receiving, by the material fetching device, the material fetching instruction, and fetching the material from the material box and/or the portable shelf according to the material fetching instruction.

In this embodiment, the material fetching device may receive the material fetching instruction through a mechanical controller, and control a mechanical arm to perform a material fetching operation according to the material fetching instruction. When the warehouse robot only includes the first warehouse robot, the material fetching device fetches the material from the material box; when the warehouse robot only includes the second warehouse robot, the material fetching device fetches the material from the portable shelf; and when the warehouse robot includes both the first warehouse robot and the second warehouse robot, the material fetching device fetches the materials from the material box and the portable shelf respectively.

When the warehouse robot includes the first warehouse robot, step S230 includes: S231, sending, by the processing terminal, at least one second material fetching instruction to the material fetching device; step S250 includes: S251, receiving, by the material fetching device, the at least one second material fetching instruction, and fetching the material from the material box according to each second material fetching instruction.

In this embodiment, the second material fetching instruction may include first target position information of movement of the material fetching device, so that the material fetching device fetches the material from the material box. One implementation thereof may be that: the first target position information of movement of the material fetching device included in the second material fetching instruction is preset, for example, a first target position point of movement of the mechanical arm of the material fetching device is preset as (x0, y0, z0), then the material fetching device will execute one material fetching from the material box every time it receives one second material fetching instruction. Another implementation may be that: the second material fetching instruction corresponds to the first material fetching instruction one-to-one, and the first target position information of movement of the material fetching device included in the second material fetching instruction is set according to a position of a storage unit corresponding to the first material fetching instruction. For example, if the position of the storage unit corresponding to the first material fetching instruction is (x1, y1, z1), then the first target position point of movement of the mechanical arm of the material fetching device is set as (x2, y1, z1) according to the first material fetching instruction. When a position of a storage unit corresponding to a next first material fetching instruction changes, the first target position information of movement of the material fetching device in the second material fetching instruction will change accordingly.

It should be noted that S241 to S244 and S231 may be executed simultaneously, so that when the first warehouse robot reaches the first target position, the material box has been fetched and adjusted to the preset height, and the material fetching device immediately fetches the material from the material box; S246 to S248 and S231 may also be executed simultaneously, so that when the first warehouse robot reaches the first target position, the material box has been fetched and adjusted to the preset height, and the material fetching device immediately fetches the material from the material box.

When the warehouse robot includes the second warehouse robot, the material fetching instruction further includes at least one fourth material fetching instruction, and at this time, step S230 includes: S232, sending, by the processing terminal, the at least one fourth material fetching instruction to the material fetching device; step S250 includes: S252, receiving, by the material fetching device, the at least one fourth material fetching instruction, and fetching a material and/or the material box from the portable shelf according to each fourth material fetching instruction.

In this embodiment, the fourth material fetching instruction may include second target position information of movement of the material fetching device, so that the material fetching device fetches the material from the portable shelf. One implementation may be that: the second target position information included in the fourth material fetching instruction is set by the processing terminal according to material fetching and placing information. For example, assuming that the portable shelf is single layered, the pallet is placed on the top of the portable shelf, and the processing terminal material fetching and placing information includes fetching the material box on the pallet, then the second target position information included in the fourth material fetching instruction is determined by position information of the pallet.

In S252, after the material fetching device receives the fourth material fetching instruction, the material fetching device controls the mechanical arm to fetch the material and/or the material box from the portable shelf according to the fourth material fetching instruction. Where the fourth material fetching instruction may also include material fetching category information, and fetching the material or the material box. For example, when the material fetching category information is first category information, the material fetching device controls the mechanical arm to fetch the material from the portable shelf; and when the material fetching category information is second category information, the material fetching device controls the mechanical arm to fetch the material box from the portable shelf.

It should be noted that S222 and S232 may also be executed simultaneously, so that when the second warehouse robot reaches the second target position, the material fetching device immediately fetches the material from the material box.

Figure 8:
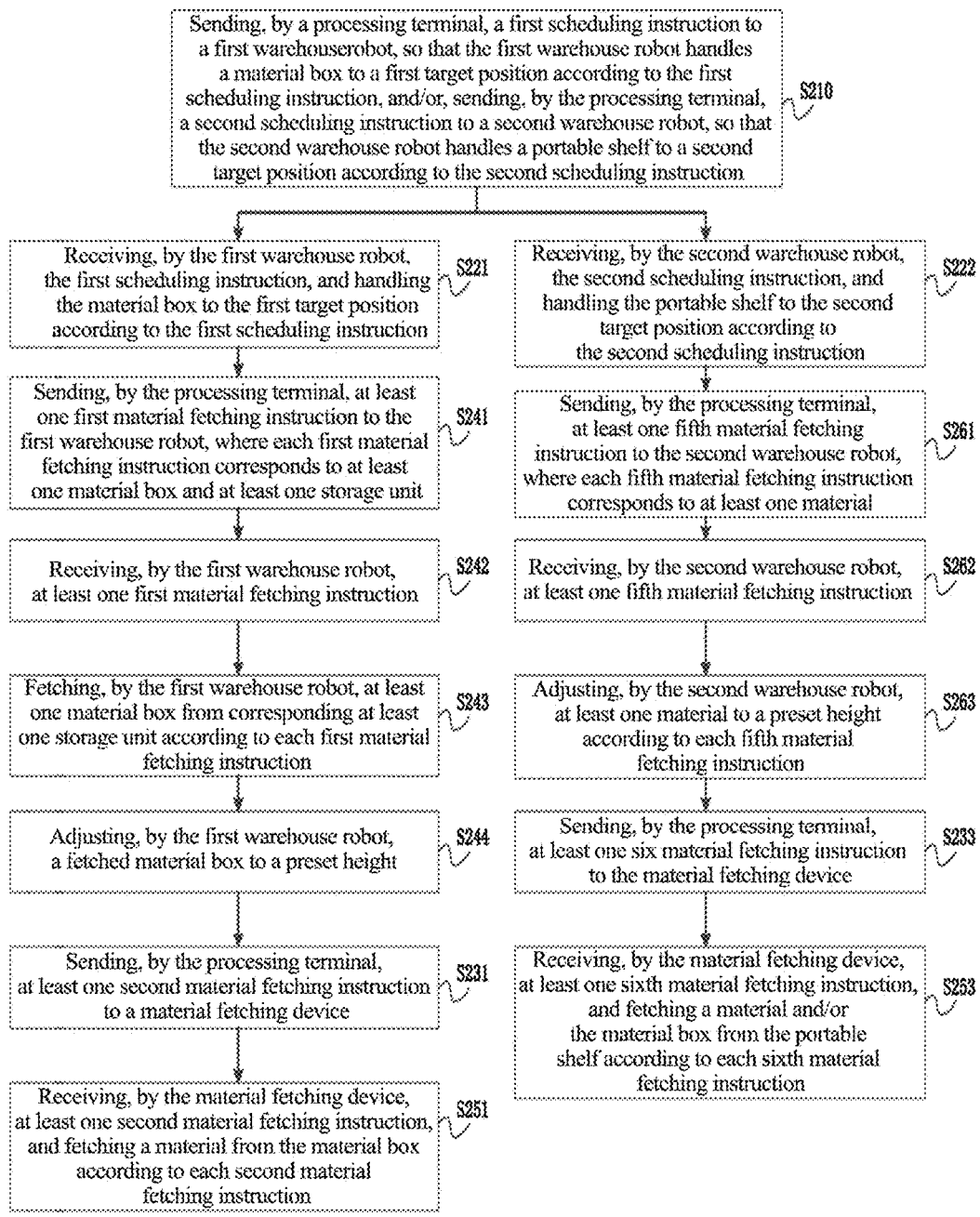
FIG. 8 is a schematic flowchart of a third intelligent warehousing method applied to the intelligent warehousing system shown in FIG. 1 according to an embodiment of the present application.
Figure 9:
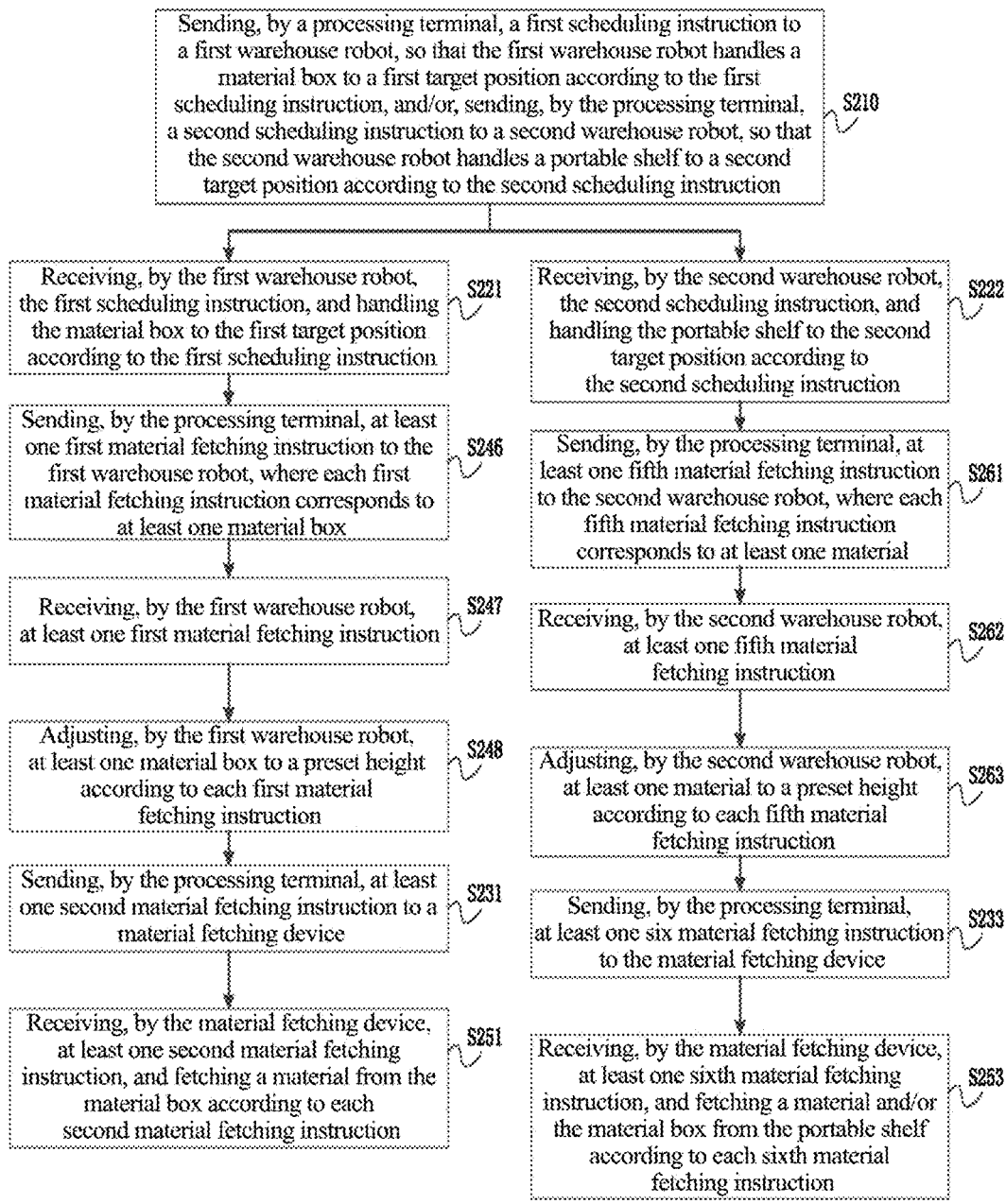
FIG. 9 is a schematic flowchart of a fourth intelligent warehousing method applied to the intelligent warehousing system shown in FIG. 1 according to an embodiment of the present application.

In an implementation, referring to FIG. 8 and FIG. 9, the method further includes: S261, sending, by the processing terminal, at least one fifth material fetching instruction to the second warehouse robot, where each fifth material fetching instruction corresponds to at least one material; S262, receiving, by the second warehouse robot, the at least one fifth material fetching instruction; S263, adjusting, by the second warehouse robot, the at least one material to a preset height according to each fifth material fetching instruction; step S230 includes: S233, sending, by the processing terminal, at least one six material fetching instruction to the material fetching device; step S250 includes: S253, receiving, by the material fetching device, the at least one sixth material fetching instruction, and fetching the material and/or the material box from the portable shelf according to each sixth material fetching instruction.

The fifth material fetching instruction corresponding to at least one material may be that: one fifth material fetching instruction includes target height information of one or more materials. For example, assuming that a material b is currently located at (2, 0, 1), and target height information of the material b contained in the fifth material fetching instruction is (2, 0, 3), then when the second warehouse robot receives the fifth material fetching instruction, the second warehouse robot lifts the material to the preset height according to the preset height corresponding to the target height information of the material contained in the fifth material fetching instruction, so that the material fetching device goes directly to the preset height to fetch the material. The sixth material fetching instruction may include second target position information of movement of the material fetching device, so that the material fetching device fetches the material from the portable shelf. One implementation may be that: the second target position information of movement of the material fetching device included in the sixth material fetching instruction is preset, so that the material fetching device moves to a suitable height to fetch the material and/or the material box from the portable shelf. In an implementation, the method further includes: after receiving the material fetching instruction, detecting, by the material fetching device, whether the material box and/or the portable shelf are in a preset safe material fetching position, and if yes, fetching the material from the material box and/or the portable shelf according to the material fetching instruction.

In this embodiment, after the material fetching device receives the material fetching instruction (including the second material fetching instruction and/or the fourth material fetching instruction), it may be that: the material fetching device starts to perform detection immediately after receiving the material fetching instruction, or, the material fetching device does not perform detection until the material fetching instruction is received and the warehouse robot reaches the target position. Where, the "preset safe material fetching position" is a preset position area where the material box and/or the portable shelf can be safely fetched. Detecting whether the material box and/or the portable shelf are in the preset safe material fetching position may specifically be: when the material box and/or the portable shelf are within a preset safe material fetching position range, they are in a preset safe material fetching position, then the material fetching device executes a material fetching action; when the material box and/or the portable shelf are not within the preset safe material fetching position range, they are not in the preset safe material fetching position, then the material fetching device does not execute the material fetching action. Where whether the material box and/or the portable shelf are in the preset safe material fetching position is detected by setting an image sensor, a depth sensor or other sensor on the mechanical arm of the material fetching device. By using the sensor to detect positions of the material box and/or the portable shelf, whether material fetching can be safely done is determined, which avoids damage caused by collision between the mechanical arm and the material box and/or the portable shelf.

In an implementation, the method further includes: before the material fetching device fetches the material from the material box and/or the portable shelf according to the material fetching instruction, the material fetching device adjusts the material fetching position. A specific implementation may be that: if it is detected that the material box and/or the portable shelf are not in the preset safe material fetching position, the material fetching action is not executed, and the material fetching device adjusts the material fetching position, until that the material box and/or the portable shelf are in the preset safe material fetching position, then the material fetching device executes the material fetching action.

In an implementation, when the intelligent warehousing system includes a sorting device (as shown in FIG. 1), the method further includes: receiving, by the material fetching device, a seventh material fetching instruction, and placing the material fetched from the material box and/or the portable shelf into a corresponding sorting device according to the seventh material fetching instruction. Where the seventh material fetching instruction includes material placing position information. A specific implementation may be that: the mechanical controller of the material fetching device receives the seventh material fetching instruction carrying the material placing position information, and the mechanical controller controls the mechanical arm to place the fetched material to the corresponding sorting device according to the seventh material fetching instruction.

In an implementation, the method further includes: after completing material fetching, sending, by the material fetching device, a material fetching completion instruction; receiving, by the processing terminal, the material fetching completion instruction sent by the material fetching device, and instructing the first warehouse robot to handle the material box to a third target position according to the material fetching completion instruction, and/or, instructing the second warehouse robot to handle the portable shelf to a fourth target position according to the material fetching completion instruction.

"After completing material fetching" may refer to after the material fetching device fetches the material from the warehouse robot, or after the material fetching device fetches the material from the warehouse robot and places the material in the sorting device. The material fetching device sending the material fetching completion instruction may specifically be that: the material fetching device directly sends the material fetching completion instruction to the processing terminal; or, the material fetching device sends the material fetching completion instruction to the warehouse robot, and then the warehouse robot forwards it to the processing terminal; or the material fetching device sends the material fetching completion instruction to the workstation, and then the workstation forwards it to the processing terminal, and the like. Therefore, it is enough as long as it is ensured that the processing terminal can receive the material fetching completion instruction.

After the processing terminal receives the material fetching completion instruction, the processing terminal sends a corresponding instruction so as to control the first warehouse robot to handle the material box to the third target position, and/or control the second warehouse robot to handle the portable shelf to the fourth target position. Where the third target position may be the same as the first target position, and the fourth target position may be the same as the second target position, so that the warehouse robot returns to an original material fetching area. Of course, the third target position and the fourth target position may also be other positions, so that the warehouse robot performs other handling operations.

Of course, in some other embodiments, the material fetching device may directly send the material fetching completion instruction to the warehouse robot, so that the warehouse robot executes a next operation according to the material fetching completion instruction without going through the processing terminal.

The intelligent warehousing method provided by the embodiments of the present application can realize the automation of material fetching and placing in the warehousing and thus improve efficiency, by sending the scheduling instruction through the processing terminal to the warehouse robot, handling through the warehouse robot the material box and/or the portable shelf to the target position according to the scheduling instruction, sending through the processing terminal the material fetching instruction to the first warehouse robot and the material fetching device so that the first warehouse robot fetches the material box from the storage unit, fetching through the material fetching device the material from the material box fetched through the first warehouse robot, and/or fetching through the material fetching device the material from the portable shelf handled by the second warehouse robot.

Embodiment 3

Figure 10:
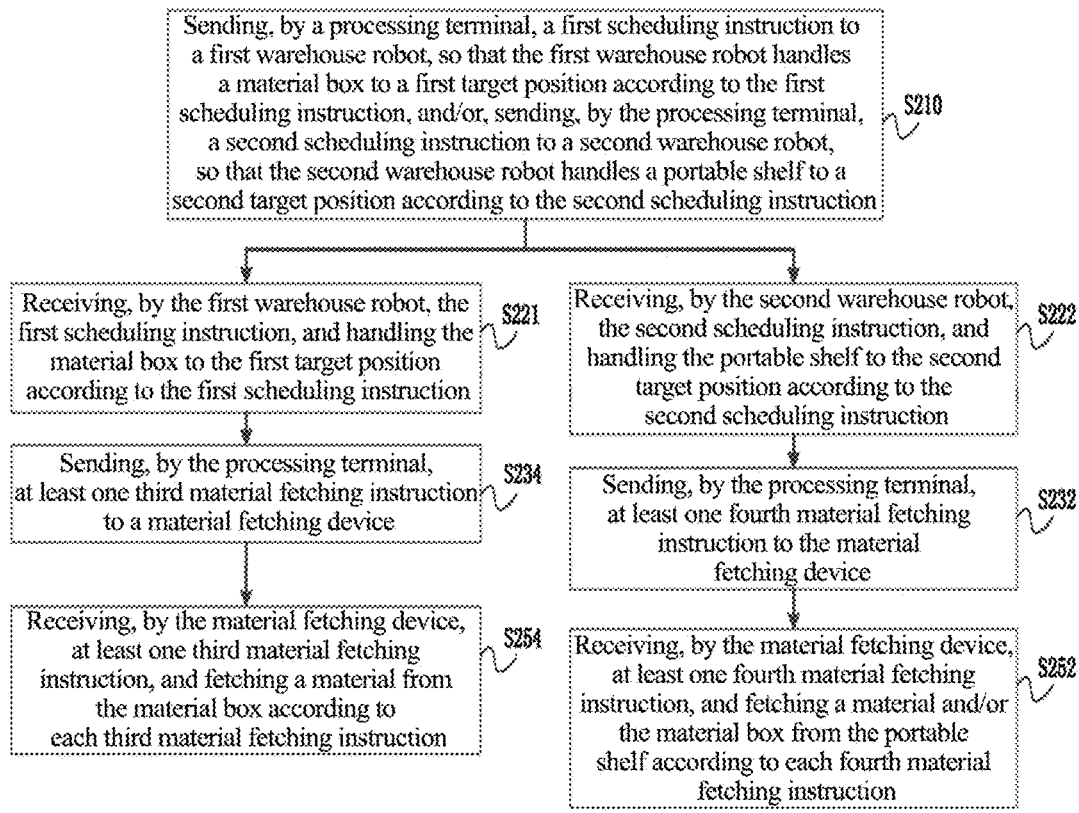
FIG. 10 is a schematic flowchart of a fifth intelligent warehousing method applied to the intelligent warehousing system shown in FIG. 1 according to an embodiment of the present application.
Figure 11:
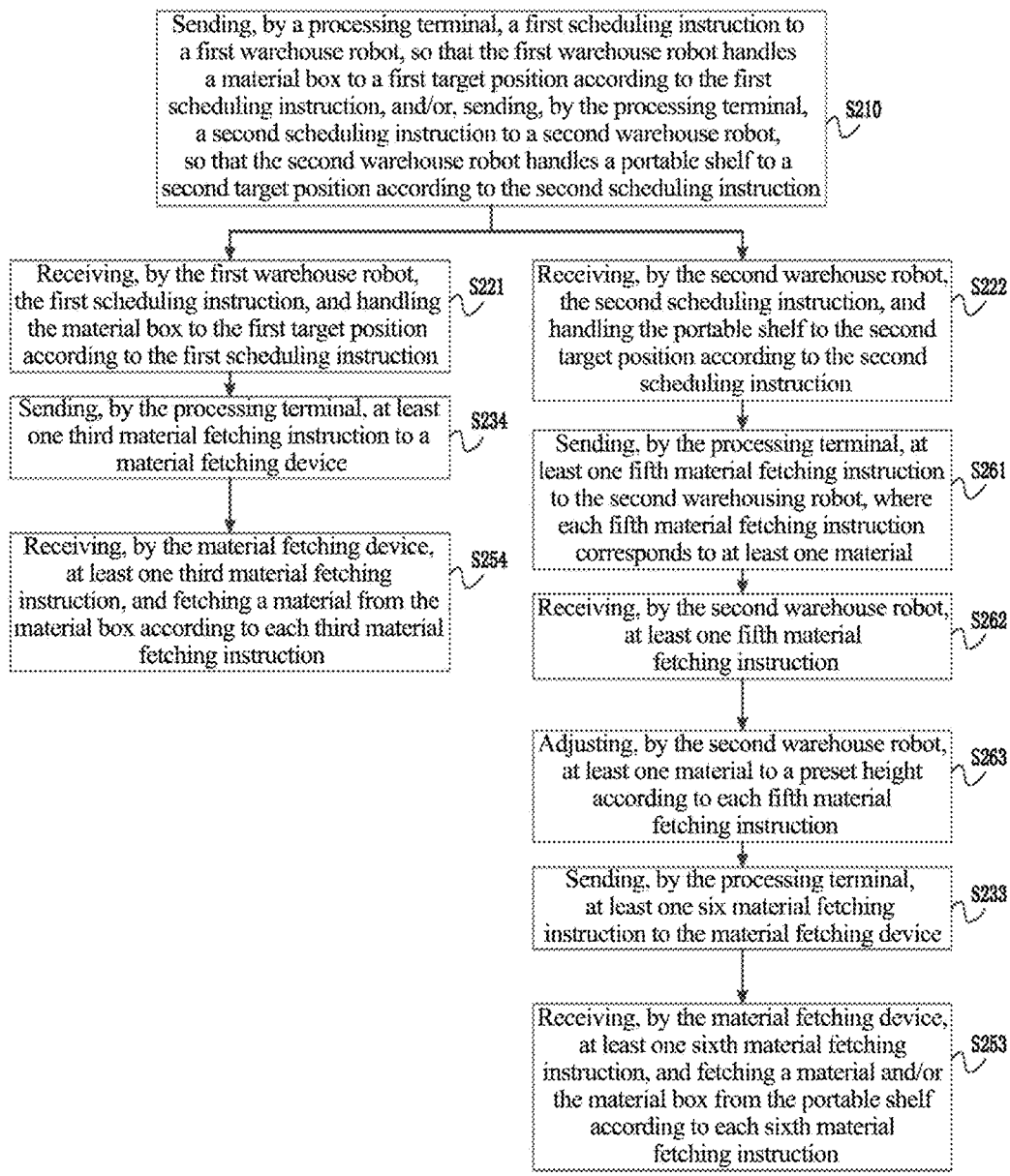
FIG. 11 is a schematic flowchart of a sixth intelligent warehousing method applied to the intelligent warehousing system shown in FIG. 1 according to an embodiment of the present application.

FIG. 10 and FIG. 11 are schematic flowcharts of a second intelligent warehousing method applied to the intelligent warehousing system shown in FIG. 1 according to an embodiment of the present application. Specifically, please refer to FIG. 10 and FIG. 11, the difference from Embodiment 2 is that:

in this embodiment, when the warehouse robot includes the first warehouse robot, the material fetching instruction includes at least one third material fetching instruction, and step S230 includes: S234, sending, by the processing terminal, the at least one third material fetching instruction to the material fetching device. Correspondingly, step S250 includes: S254, receiving, by the material fetching device, the at least one third material fetching instruction, and fetching the material from the material box according to each third material fetching instruction.

A specific implementation of S234 may be that: sending one third material fetching instruction each time, and sending several third material fetching instructions to the material fetching device, or sending multiple third material fetching instructions to the material fetching device at a time. For example, the processing terminal sends one third material fetching instruction to the material fetching device, and after the material fetching device completes a corresponding operation of the third material fetching instruction, the processing terminal sends a next third material fetching instruction to the material fetching device until all third material fetching instructions are sent. For another example, the processing terminal sends multiple third material fetching instructions to the material fetching device at one time, so that the material fetching device sequentially executes the corresponding operations of the multiple third material fetching instructions.

In an implementation, when the processing terminal sends the multiple third material fetching instructions, the method further includes that: sending, by the processing terminal, the multiple third material fetching instructions according to a preset priority order. Where the preset priority order is an order in which the material fetching device is instructed to sequentially fetch the materials. For example, assuming that the first warehouse robot includes storage units 1, 2, and 3, and the preset priority order is: the storage unit 2>the storage unit 1>the storage unit 3, then the processing terminal first sends a third material fetching instruction corresponding to the storage unit 2, and then sends a third material fetching instruction corresponding to the storage unit 1, and finally sends a third material fetching instruction corresponding to the storage unit 3, then the material fetching device first goes to a material box b of the storage unit 2, and then to a material box a of the storage unit 1, and finally to a material box c of the storage unit 3. Since the processing terminal sends the third material fetching instruction according to the preset priority order, the material fetching device can sequentially arrive at different material boxes according to the preset priority order, and the material fetching device can fetch the materials without acquiring a material fetching sequence.

In S254, it may be that: each third material fetching instruction corresponds to at least one material box, and then it may be that: one third material fetching instruction includes position information of one material box. For example, assuming that the first warehouse robot only includes the mobile chassis, the lifting component and the handling component (as shown in FIG. 2b), and the material box is provided on the handling component, then the third material fetching instruction may include position information of the handling component where the material box is located.

In S254, it may also be that: each third material fetching instruction corresponds to at least one material box and at least one storage unit, then it may be that: one third material fetching instruction includes position information of one storage unit in which one material box is located, or, one third material fetching instruction includes position information of multiple storage units where multiple material boxes are located. For example, assuming that the material box a is located in the storage unit 1, the material box b is located in the storage unit 2, and the material box c is located in the storage unit 3, and the third material fetching instruction may include position information of the storage unit 2 where the material box b is located.

When each third material fetching instruction corresponds to the at least one material box and the at least one storage unit, the material fetching device, after receiving the third material fetching instruction, determines the position of the storage unit according to the position information of the storage unit contained in the third material fetching instruction, the mechanical controller controls the mechanical arm to move, so that the mechanical arm moves to a corresponding spatial position of the storage unit corresponding to the position information of the storage unit contained in the third material fetching instruction, and controls the mechanical arm to fetch the material from the material box. For example, assuming that the material box a is located in the storage unit 1, the material box b is located in the storage unit 2, and the material box c is located in the storage unit 3, and the third material fetching instruction corresponds to the position information of the storage unit 2, then when the material fetching device receives the third material fetching instruction, the mechanical controller controls the mechanical arm to move to the corresponding spatial position of the storage unit 2, and controls the mechanical arm to fetch the material from the material box b.

A specific implementation of the mechanical arm moving to the spatial position of the storage unit corresponding to the position information of the storage unit contained in the third material fetching instruction may be that: establishing a space coordinates system, and acquiring a coordinate position of each material box of the first warehouse robot in the space coordinates system, thereby acquiring the corresponding spatial position of the storage unit.

The intelligent warehousing method provided by the embodiments of the present application can realize the automation of material fetching and placing in the warehousing and thus improve efficiency, by sending through the processing terminal the scheduling instruction to the warehouse robot, handling through the warehouse robot the material box and/or the portable shelf to the target position according to the scheduling instruction, sending through the processing terminal the material fetching instruction to the material fetching device, recognizing through the material fetching device the position of the material box on the first warehouse robot according to the material fetching instruction, and fetching the material from the material box of the first warehouse robot, and/or fetching through the material fetching device the material from the portable shelf handled by the second warehouse robot according to the material fetching instruction.

Embodiment 4

Figure 12:
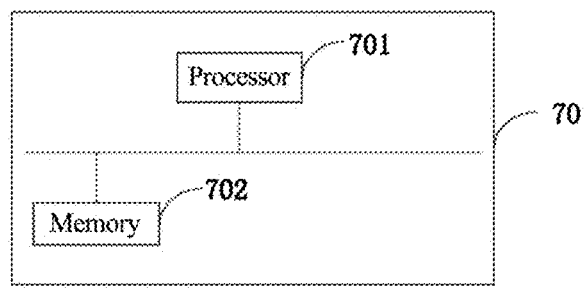
FIG. 12 is a schematic diagram of a hardware structure of a processing terminal according to an embodiment of the present application.

FIG. 12 is a schematic diagram of a hardware structure of a processing terminal according to an embodiment of the present application. The processing terminal may be any type of electronic device, such as an intelligent phone, a diagnostic robot, a personal computer, a tablet computer, and the like.

Specifically, referring to FIG. 12, the processing terminal 70 includes:

one or more processors 701 and a memory 702, where one processor 701 is taken as an example in FIG. 12.

The processor 701 and the memory 702 may be connected through a bus or in other ways, and connection through a bus is taken as an example in FIG. 12.

The memory 702, as a non-transitory computer-readable storage medium, may be configured to store non-transitory software programs, non-transitory computer-executable programs, and modules, such as program instructions/modules corresponding to the intelligent warehousing method applied to the processing terminal in the embodiments of the present application. The processor 701 is configured to execute various functional applications and data processing of the intelligent warehousing system 100 applied to the processing terminal by running the non-transitory software programs, instructions, and modules stored in the memory 702, that is, to implement the intelligent warehousing method applied to the processing terminal in any of the foregoing method embodiments.

The memory 702 may include a program storage area and a data storage area, where the program storage area may store an operation system and an application program required by at least one function; and the data storage area may store data created according to uses of the intelligent warehousing system 100 applied to the processing terminal, and the like. In addition, the memory 702 may include a high-speed random access memory, and may also include a non-transitory memory, such as at least one magnetic disk storage device, a flash memory device, or other non-transitory solid-state storage devices. In some embodiments, the memory 702 may include memories remotely provided with respect to the processor 701, and these remote memories may be connected to the processing terminal 70 via a network. Examples of the aforementioned network include, but are not limited to, Internet, corporate intranet, local area network, mobile communication network, and combinations thereof.

The memory 702 stores instructions that may be executed by at least one processor 701; the at least one processor 701 is configured to execute the instructions to implement the intelligent warehousing method applied to the processing terminal in any of the above method embodiments, for example, to execute the above described method steps S210, S241, S246, S231, S232, S261, S233, S234, and the like.

Further, the embodiments of the present application further provide a non-transitory computer-readable storage medium, the non-transitory computer-readable storage medium stores the computer-executable instructions, and the computer-executable instructions are executed by one or more processors, for example, executed by one processor 701 in FIG. 12, to enable the above-mentioned one or more processors 701 to execute the intelligent warehousing method applied to the processing terminal in any of the above-mentioned method embodiments, for example, to execute the above described method steps S210, S241, S246, S231, S232, S261, S233, S234, and the like.

Embodiment 5

Figure 13:
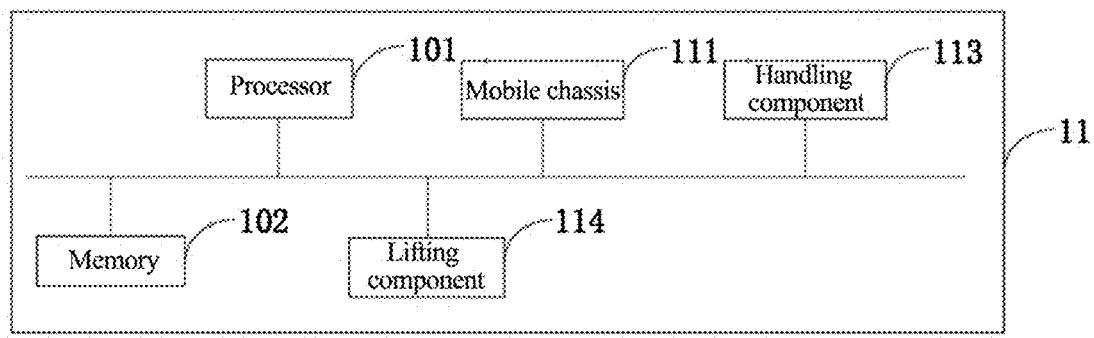
FIG. 13 is a schematic diagram of a hardware structure of a warehouse robot according to an embodiment of the present application.

FIG. 13 is a schematic diagram of a hardware structure of a warehouse robot according to an embodiment of the present application. The warehouse robot 10 includes at least one first warehouse robot 11, where the first warehouse robot 11 may have multiple structural forms (as shown in FIG. 2a to FIG. 2e).

Specifically, referring to FIG. 13, the first warehousing machine 11 includes:

one or more processors 101 and a memory 102, where one processor 101 is taken as an example in FIG. 13.

The processor 101 and the memory 102 may be connected through a bus or in other ways, and connection through a bus is taken as an example in FIG. 13. The processor 101 may also be connected to the mobile chassis 111, the handling component 113 or the lifting component 114 through a bus or in other ways, and is configured to control movement of the mobile chassis 111, the handling component 113 or the lifting component 114, respectively.

The memory 102, as a non-transitory computer-readable storage medium, may be configured to store non-transitory software programs, non-transitory computer-executable programs, and modules, such as program instructions/modules corresponding to the intelligent warehousing method applied to the first warehouse robot in the embodiments of the present application. The processor 101 is configured to execute various functional applications and data processing of the intelligent warehousing system 100 applied to the first warehouse robot by running the non-transitory software programs, instructions, and modules stored in the memory 102, that is, to implement the intelligent warehousing method applied to the first warehouse robot in any of the foregoing method embodiments.

The memory 102 may include a program storage area and a data storage area, where the program storage area may store an operating system and an application program required by at least one function; and the data storage area may store data created according to uses of the intelligent warehousing system 100 applied to the first warehouse robot, and the like. In addition, the memory 102 may include a high-speed random access memory, and may also include a non-transitory memory, such as at least one magnetic disk storage device, a flash memory device, or other non-transitory solid-state storage devices. In some embodiments, the memory 102 may include memories remotely provided with respect to the processor 101, and these remote memories may be connected to the first warehouse robot 11 via a network. Examples of the aforementioned network include, but are not limited to, Internet, corporate intranet, local area network, mobile communication network, and combinations thereof.

The memory 102 stores instructions that may be executed by at least one processor 101; the at least one processor 101 is configured to execute the instructions to implement the intelligent warehousing method applied to the first warehouse robot in any of the above method embodiments, for example, to execute the above described method steps S221, S242, S243, S244, S247, S248, and the like.

Further, the embodiments of the present application further provide a non-transitory computer-readable storage medium, the non-transitory computer-readable storage medium stores the computer-executable instructions, and the computer-executable instructions are executed by one or more processors, for example, executed by one processor 101 in FIG. 13, to enable the above-mentioned one or more processors 101 to execute the intelligent warehousing method applied to the first warehouse robot in any of the above-mentioned method embodiments, for example, to execute the above described method steps S221, S242, S243, S244, S247, S248, and the like.

The device embodiments described above are merely illustrative, where the units described as separate components may or may not be physically separated, and the components displayed as units may or may not be physical units, that is, they may be located in one place, or may be distributed into multiple network units. Some or all of the units may be selected according to actual needs for the purpose of implementing the solution of the present embodiments.

Through the description of the above embodiments, those of ordinary skill in the art may clearly understand that each embodiment may be implemented by means of software plus a general hardware platform, and of course, it may also be implemented through hardware. Those of ordinary skill in the art may understand that all or part of processes in the methods of the foregoing embodiments may be implemented by instructing relevant hardware through a computer program in a computer program product. The computer program may be stored in a non-transitory computer-readable storage medium, the computer program includes program instructions, and when the program instructions are executed by a related device, the related device may execute flow of the above-mentioned method embodiments. Where the described storage medium may be a magnetic disk, an optical disc, a read-only memory (ROM), or a random access memory (RAM), and the like.

The above-mentioned products may execute the intelligent warehousing method provided in the embodiments of the present application, and have corresponding functional modules and beneficial effects for executing the intelligent warehousing method. For technical details that are not described in detail in this embodiment, please refer to the intelligent warehousing methods provided in the embodiments of the present application.

Finally, it should be noted that the above embodiments are merely intended for describing, rather than limiting, technical solution of the present application; under the idea of the present application, the above embodiments or technical features in different embodiments may also be combined, and the steps may be implemented in any order, and there are many other variations in different aspects of the present application as described above. For the sake of brevity, they are not provided in details; although the present application has been described in detail with reference to the foregoing embodiments, those skilled in the art will understand that: they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the various embodiments of the present application.

What is claimed is:

1. An intelligent warehousing system, wherein the intelligent warehousing system comprises: a warehouse robot and a material fetching device;
    the warehouse robot comprises at least one of a first warehouse robot and a second warehouse robot;
    the first warehouse robot is configured to receive a first scheduling instruction, and handle a material box to a first target position according to the first scheduling instruction;
    the second warehouse robot is configured to receive a second scheduling instruction, and handle a portable shelf to a second target position according to the second scheduling instruction; and
    the material fetching device is configured to receive a material fetching instruction, and fetch a material from at least one of the material box and the portable shelf according to the material fetching instruction;
    wherein the first warehouse robot comprises at least one storage unit, or a handling component, or both the at least one storage unit and the handling component;
    the handling component is configured to fetch the material box from the at least one storage unit, or the handling component is configured to place the material box in the at least one storage unit;
    wherein the first warehouse robot comprises a lifting component:
    the first warehouse robot is configured to receive a first material fetching instruction to control the lifting component, and the first material fetching instruction corresponds to the material box;
    the lifting component is configured to drive the at least one storage unit to move, or the lifting component is configured to drive the handling component to move, so as to adjust the material box to the preset height; and
    the material fetching device is configured to receive a second material fetching instruction to fetch the material from the material box;
    wherein the first warehouse robot is further configured to place the material box back into one of the at least one storage unit corresponding to the material box after the material fetching device completes fetching of the material from the material box.

2. He intelligent warehousing system according to claim 1, wherein the material fetching instruction comprises a third material fetching instruction;
    the material fetching device is configured to receive a third material fetching instruction to fetch the material from the material box; or
    the material fetching device is configured to receive the third material fetching instruction to fetch the material from the material box at one of the at least one storage unit corresponding to the material box.

3. The intelligent warehousing system according to claim 1, wherein the material fetching instruction comprises a fourth material fetching instruction;

the material fetching device is configured to receive the fourth material fetching instruction to fetch the material from the portable shelf according to the fourth material fetching instruction;
or, wherein the material fetching instruction comprises a fifth material fetching instruction and a sixth material fetching instruction;
the second warehouse robot is configured to receive the fifth material fetching instruction to adjust at least one material to a preset height; and
the material fetching device is configured to receive the sixth material fetching instruction to fetch the material from the portable shelf.

4. The intelligent warehousing system according to claim 1, wherein the material fetching device is configured to fetch the material from at least one of the material box and the portable shelf according to the material fetching instruction after detecting the material box is in a preset safe material fetching position;
wherein the material fetching device is configured to adjust a material fetching position before fetching the material from at least one of the material box and the portable shelf according to the material fetching instruction;
wherein the material fetching device is configured to send a material fetching completion instruction after completing material fetching, to enable the first warehouse robot to handle the material box to a third target position, and/or to enable the second warehouse robot to handle the portable shelf to a fourth target position.

5. The intelligent warehousing system according to claim 1, wherein the material fetching device is provided with a material fetching mechanism, and the material fetching mechanism comprises at least one of a suction nozzle component and a gripper component; and
the material fetching device is configured to fetch the material from at least one of the material box and the portable shelf through the material fetching mechanism; or
the material fetching device comprises: a mechanical arm and a mechanical controller; and
the mechanical controller is built in or placed outside the mechanical arm, and the mechanical controller is connected to the mechanical arm; and
the mechanical controller is configured to control the mechanical arm to fetch the material from at least one of the material box and the portable shelf according to the material fetching instruction.

6. The intelligent warehousing method according to claim 5, wherein the first warehouse robot comprises a handling component and a lifting component, the handling component is configured to handle the material box, and the lifting component is configured to drive the handling component to move, so as to adjust the handling component to a preset height;
the intelligent warehousing method further comprises:
sending a first material fetching instruction to the first warehouse robot to control the lifting component, with the first material fetching instruction corresponding to the material box, so that the first warehouse robot adjusts the material box to a preset height; and
sending the material fetching instruction to the material fetching device so that the material fetching device fetches the material from at least one of the material box and the portable shelf according to the material fetching instruction comprises:
sending a second material fetching instruction to the material fetching device, so that the material fetching device fetches the material from the material box.

7. The intelligent warehousing method according to claim 5, wherein the material fetching instruction comprises a third material fetching instruction,
sending the material fetching instruction to the material fetching device so that the material fetching device fetches the material from at least one of the material box and the portable shelf according to the material fetching instruction comprises:
sending the third material fetching instruction to the material fetching device, so that the material fetching device fetches the material from the material box.

8. The intelligent warehousing method according to claim 5, wherein the material fetching instruction comprises a third material fetching instruction,
sending the third material fetching instruction to the material fetching device so that the material fetching device fetches the material from the material box comprises:
sending the third material fetching instruction to the material fetching device, so that the material fetching device fetches the material from the material box at one of the at least one storage unit corresponding to the material box.

9. The intelligent warehousing method according to claim 5, wherein the material fetching instruction comprises a fourth material fetching instruction;
sending the material fetching instruction to the material fetching device so that the material fetching device fetches the material from at least one of the material box and the portable shelf according to the material fetching instruction comprises:
sending the fourth material fetching instruction to the material fetching device, so that the material fetching device fetches the material from the portable shelf according to the fourth material fetching instruction;
or, wherein the material fetching instruction comprises a fifth material fetching instruction and a sixth material fetching instruction;
the intelligent warehousing method further comprises:
sending the fifth material fetching instruction to the second warehouse robot, so that the second warehouse robot adjusts at least one material to a preset height; and
sending the material fetching instruction to the material fetching device so that the material fetching device fetches the material from at least one of the material box and the portable shelf according to the material fetching instruction comprises:
sending the sixth material fetching instruction to the material fetching device, so that the material fetching device fetches the material from the portable shelf;
wherein the intelligent warehousing method further comprises:
receiving a material fetching completion instruction sent by the material fetching device; and
instructing the first warehouse robot to handle the material box to a third target position according to the material fetching completion instruction; and/or instructing the second warehouse robot to handle the portable shelf to a fourth target position according to the material fetching completion instruction.

10. The intelligent warehousing method according to claim 5, wherein the intelligent warehousing method further comprises:

sending a seventh material fetching instruction to the material fetching device, so that the material fetching device places the material fetched from at least one of the material box and the portable shelf to a sorting device according to the seventh material fetching instruction.

11. The intelligent warehousing system according to claim 1, wherein the intelligent warehousing system further comprises: a workstation and a sorting device; and
the material fetching device is provided on the workstation, and the first target position and the second target position are located in a preset area of the workstation;
the sorting device comprises at least one of a putwall and a transmission belt;
the material fetching device is configured to receive a seventh material fetching instruction to place the material fetched from at least one of the material box and the portable shelf to the sorting device;
wherein the intelligent warehousing system further comprises: at least one of an immobile shelf and the portable shelf; and
the immobile shelf is configured to store the material box;
the portable shelf is configured to store at least one of a pallet, the material box, and the material;
the material box is configured to store the material; and
the pallet is configured to hold at least one of the material and the material box.

12. The intelligent warehousing system according to claim 1, wherein the intelligent warehousing system further comprises: a processing terminal; and
the processing terminal is configured to send the first scheduling instruction to the first warehouse robot, so that the first warehouse robot handles the material box to the first target position according to the first scheduling instruction;
and/or,
the processing terminal is configured to send the second scheduling instruction to the second warehouse robot, so that the second warehouse robot handles the portable shelf to the second target position according to the second scheduling instruction; and
the processing terminal is further configured to send the material fetching instruction to the material fetching device, so that the material fetching device fetches the material from at least one of the material box and the portable shelf according to the material fetching instruction.

13. An intelligent warehousing method, applied to a processing terminal, wherein the intelligent warehousing method comprises:
sending a first scheduling instruction to a first warehouse robot, so that the first warehouse robot handles a material box to a first target position according to the first scheduling instruction; and/or, sending a second scheduling instruction to a second warehouse robot, so that the second warehouse robot handles a portable shelf to a second target position according to the second scheduling instruction; and
sending a material fetching instruction to a material fetching device, so that the material fetching device fetches a material from at least one of the material box and the portable shelf according to the material fetching instruction;
wherein the first warehouse robot comprises a handling component, a lifting component, and at least one storage unit, the at least one storage unit is configured to store the material box, the handling component is configured to fetch the material box from at least one of the storage unit, or the handling component is configured to place the material box in the at least one storage unit, and the lifting component is configured to drive the handling component to move relative to the at least one storage unit;
the intelligent warehousing method further comprises:
sending a first material fetching instruction to the first warehouse robot to control the lifting component, with the first material fetching instruction corresponding to the material box and the at least one storage unit, so that the first warehouse robot fetches the material box from the at least one storage unit; and
sending the material fetching instruction to the material fetching device so that the material fetching device fetches the material from at least one of the material box and the portable shelf according to the material fetching instruction comprises:
sending a second material fetching instruction to the material fetching device, so that the material fetching device fetches the material from the material box;
wherein the intelligent warehousing method further comprises:
receiving a material fetching completion instruction sent by the material fetching device; and
instructing the first warehouse robot to place the material box back into one of the at least one storage unit corresponding to the material box.

14. An intelligent warehousing method, applied to a warehouse robot, the warehouse robot comprising at least one first warehouse robot, wherein the intelligent warehousing method comprises:
receiving a first scheduling instruction, and handling a material box to a first target position according to the first scheduling instruction, so that a material fetching device fetches a material from the material box according to a material fetching instruction after receiving the material fetching instruction;
wherein the first warehouse robot comprises a handling component, a lifting component and at least one storage unit, the at least one storage unit is configured to store the material box, the handling component is configured to fetch the material box from the at least one storage unit, or the handling component is configured to place the material box in the at least one storage unit, and the lifting component is configured to drive the handling component to move relative to the at least one storage unit;
the intelligent warehousing method further comprises:
receiving a first material fetching instruction to fetch the material box from the at least one storage unit:
wherein the intelligent warehousing method further comprises:
placing the material box back into one of the at least one storage unit corresponding to the material box after the material fetching device completes fetching of the material from the material box.

15. The intelligent warehousing method according to claim 14, wherein the first warehouse robot comprises a handling component and a lifting component, the handling component is configured to handle the material box, and the lifting component is configured to drive the handling component to move, so as to adjust the handling component to a preset height;
the intelligent warehousing method further comprises:

receiving a first material fetching instruction to adjust the material box to a preset height.

\* \* \* \* \*